United States Patent [19]

Kawasaki et al.

[11] Patent Number: 5,223,877
[45] Date of Patent: Jun. 29, 1993

[54] CAMERA SYSTEM

[75] Inventors: Masahiro Kawasaki; Hiroyuki Takahashi; Shigeru Iwamoto, all of Tokyo, Japan

[73] Assignee: Asahi Kogaku Kabushiki Kaisha, Tokyo, Japan

[21] Appl. No.: 656,223

[22] Filed: Feb. 15, 1991

[30] Foreign Application Priority Data

Feb. 15, 1990 [JP] Japan .................................. 2-34608

[51] Int. Cl.⁵ ........................ G03B 17/00; G03B 7/00
[52] U.S. Cl. ........................................ 354/286; 354/412
[58] Field of Search ..................... 354/400, 412, 286

[56] References Cited

U.S. PATENT DOCUMENTS

| 4,404,595 | 9/1983 | Ushiro et al. . | |
| 4,541,700 | 9/1985 | Bletz et al. ........................ | 354/286 |
| 4,560,267 | 12/1985 | Nakai et al. . | |
| 4,596,449 | 6/1986 | Iwata et al. . | |
| 4,673,275 | 6/1987 | Nakai et al. . | |
| 4,682,871 | 7/1987 | Metabi ................................ | 354/400 |
| 4,737,812 | 4/1988 | Hasegawa et al. ............. | 354/286 X |
| 4,739,356 | 4/1988 | Ogura et al. . | |
| 4,777,164 | 10/1988 | DeVries et al. . | |
| 4,788,567 | 11/1988 | Hamano . | |
| 4,816,859 | 3/1989 | Maruyama et al. .............. | 354/195.1 |
| 4,896,181 | 1/1990 | Saegusa . | |
| 4,936,664 | 6/1990 | Haraguchi et al. . | |
| 5,060,005 | 10/1991 | Itoh et al. ........................ | 354/412 |
| 5,065,175 | 11/1991 | Suzuki et al. .................... | 354/400 |

FOREIGN PATENT DOCUMENTS

| 3329897 | 2/1987 | Fed. Rep. of Germany . |
| 63-184719 | 7/1988 | Japan . |
| 1532576 | 11/1978 | United Kingdom . |

OTHER PUBLICATIONS

English translation of German Office Action.

Primary Examiner—Russell E. Adams
Attorney, Agent, or Firm—Sandler Greenblum & Bernstein

[57] ABSTRACT

A camera system includes a camera body, and an interchangeable lens that is detachably mounted to the camera body. The interchangeable lens includes an input/output circuit for performing input/output information relative to the camera body and a timing circuit outputs a clock signal. The camera body includes an information processing circuit for performing data communication relative to the input/output circuit on the basis of the clock signal outputted from said timing circuit.

20 Claims, 24 Drawing Sheets

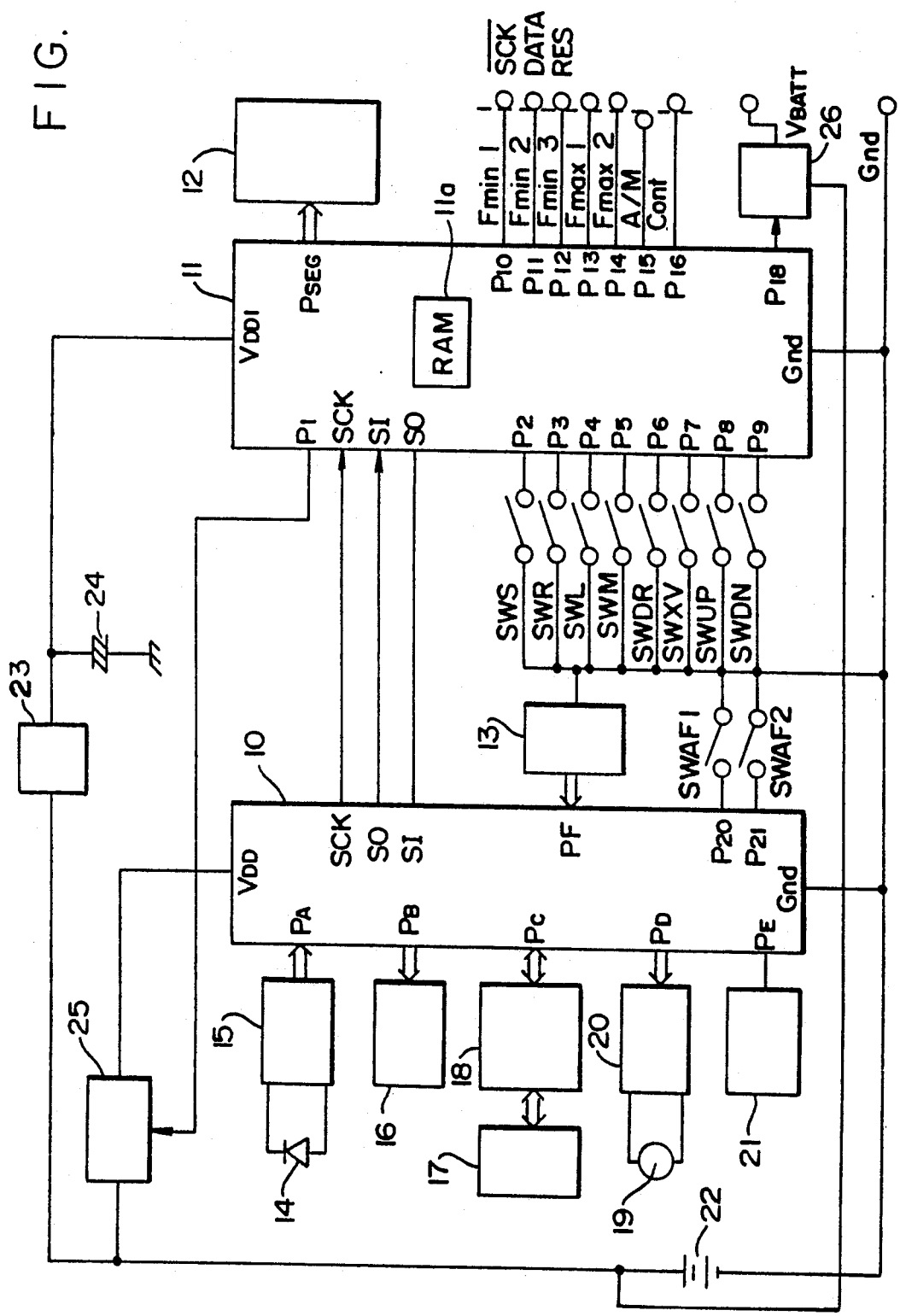

CAMERA SYSTEM

FIELD OF THE INVENTION

This invention is directed to a camera system having a camera body and a lens, particularly to a communication system between the camera body and lens.

DESCRIPTION OF RELATED ART

Since a single reflex camera is a camera system in which lens are interchangeable, it is necessary to have means for transferring lens-specific data to a camera body. Such data include a full opening F number used for an automatic exposure and automatic focusing functions used in the camera body.

To achieve this, conventional camera lenses are equipped with a lens ROM wherein specific information for the camera lens is stored. Electrical contact points are also equipped on both the lens and camera body so that such information can be exchanged when the camera lens is mounted on the body (refer to, for example, Japanese patent Unexamined Publication (KOKAI) No. 63-184719 (Application No. 61-234141).

In the conventional single reflex camera system, only data obtained by the address signal from the body is sent out with the clock pulse of the camera body.

Such structure is satisfactory when there is no control means for controlling a motor or the like in the camera lens.

However, when another motor is used in the lens to control a power zoom (power zoom by motor) or the like, the camera body is overloaded, because all the control objects within the camera lens must be controlled by the control means (information processing means) in the camera body.

As mentioned above, the single reflex camera presumes the use of more than one lens, each of which has different specific information from the other. Because of this, the calculation capacity goes up with an increasing rate as the number of control means in the lens increases, resulting in an overload to the camera body. Furthermore, there are other problems, such as prolonged processing time.

SUMMARY OF THE INVENTION

Therefore, it is preferred, from a systems point of view, that each lens itself have control and information processing capabilities when its functions are diversified.

To achieve this purpose, the invention features a camera system comprising a camera body, and an interchangeable lens that is detachably mounted to the camera body, said the lens including: input/output means for performing information input/output relative to the camera body and timing means for outputting a clock signal, said camera body including: information processing means for performing data communication relative to the input/output means on the basis of the clock signal output from the timing means.

According to the aforementioned composition, the load to the body is decreased because information exchanges between the lens and the camera body are executed by the clock pulse from the timing means of the lens.

The present disclosure relates to subject matter contained in Japanese patent application No. 02-34608 (filed on Feb. 15, 1990) which is expressly incorporated herein by reference in its entirety.

BRIEF DESCRIPTION OF THE DRAWINGS

The invention will be described below in detail with reference to the accompanying drawings, in which:

FIG. 3A is a circuit diagram of a body of the camera system of FIG. 1;

DESCRIPTION OF PREFERRED EMBODIMENTS

Figure 1:
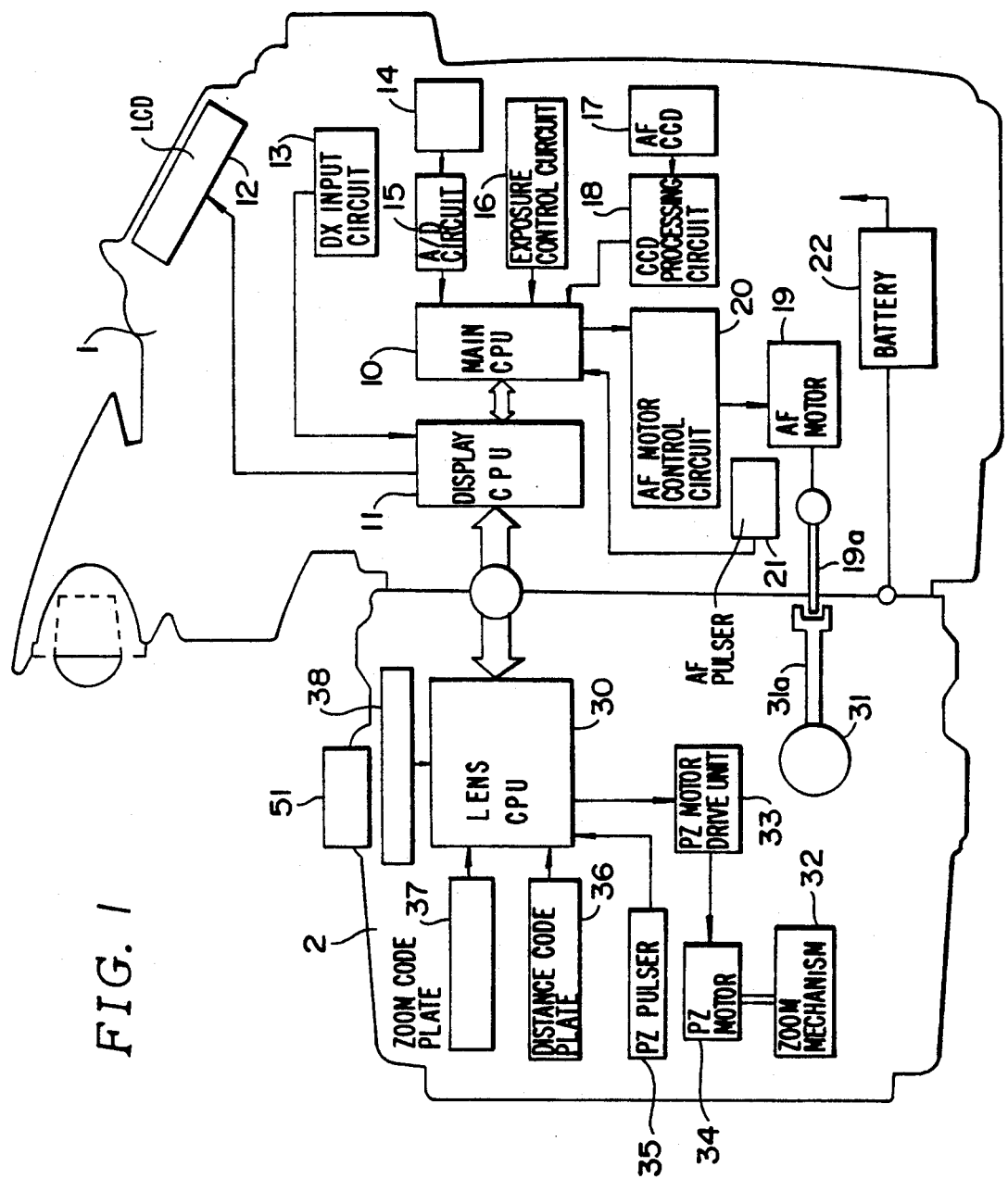
FIG. 1 is a block diagram illustrating one embodiment of a camera system according to the present invention.

In FIG. 1, a camera body 1 includes a main CPU 10 for processing various kinds of photographic information, and a display CPU 11 which mainly performs information input by means of a switch, transmitting and receiving information with respect to a taking lens and displaying the same.

The display CPU 11 is connected to an LCD panel 12 for displaying a variety of information, and to a Dx code input circuit 13 for inputting an ISO sensitivity of a film, which is to be used from a Dx code printed on a patrone. The main CPU 10 is connected to a light-receiving element 14 via an A/D circuit 15. The light-receiving element 14 determines a luminance flux of an object coming through a photographing lens 2. The main CPU 10 is further connected to an exposure control circuit 16 which controls a shutter based on various input photographing conditions, a CCD processing circuit 18 for detecting a focal condition of the photographing lens 2 from an output of an automatic focus (AF) CCD 17, an AF motor control circuit 20 for driving an AF motor 19 for automatic focussing of the lens 2, and an AF pulser 21 for detecting a pulse number of a drive of the AF motor 19.

The AF motor 19 is adapted to transmit a drive force to the interchangeable lens barrel 2 by means of a coupler 19a that is mounted on a mount aperture.

A battery 22 supplies electrical power to an active element within the above-mentioned camera body and also supplies electric power to any applicable motors and/or CPU's within the interchangeable lens barrel 2.

In the preferred embodiment, the lens barrel 2 includes a lens CPU 30 for transmitting and receiving information relative to the body side or for processing information in the lens 2.

Inside the lens barrel 2, there is provided a focusing mechanism 31 which performs a focusing by moving a focusing lens group in an optical axis direction, and a zoom mechanism 32 for performing zooming by moving variable power lens groups in the optical axis direction. The focus mechanism 31 includes a coupler 31a which connects to the coupler 19a when the lens 2 is mounted on the body 1. The focus mechanism 31 performs the focusing operation by means of power supplied thereto through the couplers 19a and 31a. The focus mechanism also permits manual operation thereof for the focusing operation when it is disengaged from the coupler 19a. The zoom mechanism 32 is capable of being driven by a power zoom (PZ) motor 34 which is controllably driven by the lens CPU 30 through a power zoom motor drive circuit 33. The zoom mechanism 32 is designed so as to be selectively driven by either a manual operation or by the motor 34 depending on which is selected through a change-over operation, which will be explained later.

Means for inputting information relative to the lens CPU 30 include use of a PZ pulser 35 for detecting a drive amount of the PZ motor 34 in terms of pulse numbers; a zoom-operation code plate 38 for inputting information regarding the direction and speed of the power zoom, which works by operating the distance code plate 36 for inputting position information of the lens which has been determined by the focus mechanism 31, a zoom code plate for inputting a focal length of the lens 2 which has been determined by the zoom mechanism 32, and a zoom operation ring 51.

Although not shown in detail, the code plates 36 and 37 are usually constructed by combining a code plate fixed to a rotatable cam ring and a plurality of brushes secured to a fixed ring which slidably engages with the code plate. Although an absolute rotational position of each of the cam rings is detected by the engagement state of the code plate and the brush, the code plates 36 and 37 are generally indicated as a code plate for clarification.

Information inherent to the lens, such as a full-open F number (minimum F number), is recorded in a ROM that is part of the lens CPU 30. Accordingly, it is not necessary to provide a separate lens ROM, as in prior art.

Figure 2A:
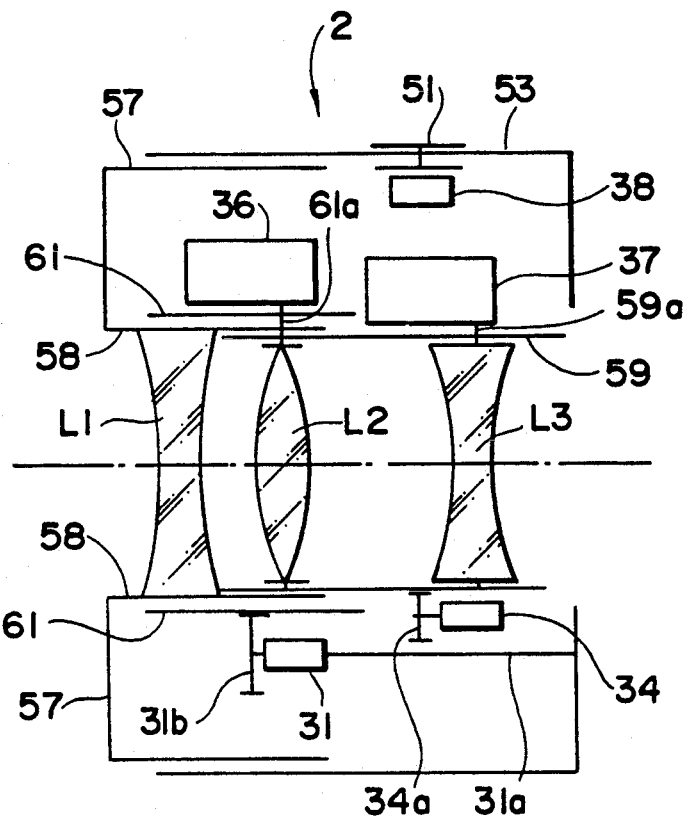
FIGS. 2A and 2B are mechanical compositions of a lens driving system.
Figure 2B:
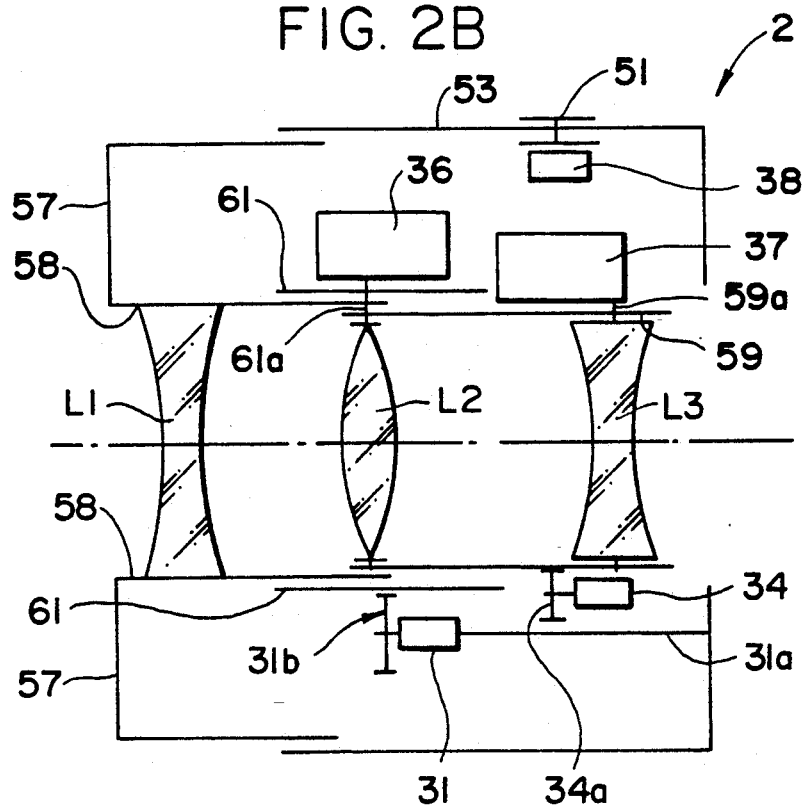

The mechanical composition of the lens driving system for the camera lens (zoom lens) that applies the examples of use is explained below referring to FIGS. 2A and 2B, which show its main part. FIG. 2A shows an accommodated position of the lens 2, and FIG. 2B shows a shooting position of the lens 2.

The lens barrel 2 is provided with a stationary lens barrel 53 on its outside, and the zoom operation ring 51 is mounted on a periphery of the stationary lens barrel 53 so that the ring 51 can rotate about the optical axis. At a front end (i.e., subject side) of the lens barrel 53, a decoration barrel 57 is mounted so that it can move freely in the optical axis direction. At a front end of the decoration barrel 57, an inner barrel portion 58 is formed, and a zoom cam ring 59 is supported on an inside of the inner barrel portion 58 to rotate freely. A focus cam ring 61 is supported on an outside of the zoom cam ring 59 and the inner barrel portion 58 to rotate freely.

First lens group L1 for focusing is mounted on the inner barrel portion 58. Second and third lens groups L2 and L3 for zooming are located inside the zoom cam ring 59. The above-mentioned decoration barrel 57, i.e. first lens group L1, is driven by the focusing cam ring 61 via the cam system which consists of a cam groove (not shown) formed on the zoom cam ring 59 and a cam pin 59a fitted in the cam groove. The above-mentioned second and third lens groups L2 and L3 are moved in the optical axis direction in a predetermined spatial relationship by the rotation of the zoom cam ring 59.

The above-mentioned focusing cam ring 61 is driven by the AF motor 19 via a joint 31a and a gear line 31b, whereas the zoom cam ring 59 is driven by a PZ motor 34 via a gear train 34a. The rotating position of the zoom cam ring 61 is detected via the zoom code plate 37, while the position of the focusing cam ring 61 is detected via the focal length code plate 36.

In the lens barrel 2, the decoration barrel 57 retracts to its maximum, and goes into a deepest position of the stationary lens barrel 53, as shown in FIG. 2A, when it is accommodated, resulting in the shortest overall length of the lens 2.

On the other hand, in the shooting condition, the decoration barrel 57 extrudes from the stationary lens barrel 53, as shown in FIG. 2B, making the overall length of the lens 2 larger. In the shooting condition, focusing is done in the following manner: the zoom cam ring 59 rotates as the PZ motor 34 rotates, and second and third lens groups L2 and L3 move relative to each other for zooming in the optical axis direction, changing the distance between them. The focusing cam ring 61 rotates as the AF motor 19 rotates, and the first lens group L1 (decoration barrel 57) moves in the optical axis direction.

The above-illustrated examples are part of the claimed invention, to which the invention is not limited, and it is obvious that the present invention can be applied to other power zoom mechanisms, camera lenses with a focusing mechanism, or lenses with a single focal length.

Circuit of the Body

The block diagram will be explained hereinbelow with reference to further detailed circuit diagrams.

FIG. 3A illustrates a circuit of a body 1.

Terminal $V_{DD1}$ of the display CPU 11 is supplied with voltage from the battery 22 which is transformed by a regulator 23. A capacitor 24 backs up the $V_{DD1}$ terminal so that the terminal is supplied with a constant voltage.

Terminal $P_1$ of the display CPU 11 is connected to a DC/DC converter 25 for performing an ON/OFF actuation of power of the main CPU 10. Terminal $P_2$ is connected to a photometric switch SWS which is designed to turn ON upon a first stage depression of a shutter button (not shown). Terminal $P_3$ is connected to a release switch SWR which is designed to turn ON upon a second stage depression of the shutter button. Terminal $P_4$ is connected to a lock switch SWL which is designed to turn ON when the camera is put into a photographing condition. ON/OFF data of each of the switches corresponding to each terminal is inputted to the CPU 11. The DC/DC converter 25 is actuated by an instruction from the display CPU 11 when the photometric switch SWS or the release switch SWR is turned ON while the lock switch SWL is in an ON condition, or when data regarding the lens side is inputted so as to supply power to terminal $V_{DD}$ of the main CPU 10 for the actuation thereof.

Terminal $P_5$ of the display CPU 11 is connected to a mode switch SWM which permits, in the ON state, selection of the following photographing modes: programmed photography, automatic photography; or manual photography. Terminal $P_6$ is connected to a drive switch SWDR which permits, in the ON state, selection of single photography, sequential photography, etc. Terminal $P_7$ is connected to an exposure correction switch SWXV which, in the ON state, permits correction of a predetermined exposure. Upon actuation of an up-count switch SWUP connected to terminal $P_8$, or upon actuation of a down-count switch SWDn connected to terminal $P_9$; while keeping the switches connected to the P5 and P7 terminals in the ON position, each setting can be changed.

A group of terminals $P_{SEG}$ is provided so as to drive the LCD panel 12 and is adapted to display various data needed for photography when the lock switch SWL is turned ON.

Terminals $P_{10}$–$P_{18}$ of the display CPU 11 are connected terminal $P_{10}$ is connected to body side contact Fmin1; terminal $P_{11}$ is connected to body side contact Fmin2; terminal $P_{12}$ is connected to body side contact Fmin3; terminal $P_{13}$ is connected to body side contact Fmax1; terminal $P_{14}$ is connected to body side contact Fmax2; terminal $P_{15}$ is connected to body side contact A/M; terminal $P_{16}$ is connected to body side contact Cont; terminal $P_{17}$ is connected to body contact Vdd; and terminal $P_{18}$ is connected to switch circuit contact 26.

The switch circuit 26 is designed to make switching between body side $V_{BATT}$ contact and the battery 22 by means of a H(High)/L(Low) of the P18 terminal, and body side Gnd contact, which together with the Gnd terminal of the display CPU 11, is connected to a ground side of the battery 22.

The display CPU 11 and main CPU 10 perform data transfer using instruction commands as shown in Table 1 below through a serial clock terminal SCK, a serial-in terminal SI and a serial-out terminal SO. The left column in Table 1 shows code output from the display CPU 11 to the main CPU 10, the codes being set in accordance with data regarding a switch of the body 1, lens ROM, lens CPU, etc. The right column in Table 1 indicates data output from the main CPU 10 to the display CPU 11, the data being set in accordance with measurement data obtained by a photo-optical device, distance measurement device, etc., which are controlled by the main CPU 10.

TABLE 1

| Display CPU→Main CPU | Main CPU→Display CPU |
|---|---|
| mode set data | display Tv, Sv data |
| drive set data | film sensitivity information |
| exposure correction set data | AF accommodation pulse number data |
| lens CPU data | AF return-completion code |
| set Tv, Sv data | |
| AF accommodation code | |
| AF return code | |
| AF return pulse number data | |
| AF accommodation, return code | |

A group of contacts $P_A$ of the main CPU 10 are connected to an A/D circuit 15 for photometry; a group of contacts PB are connected to an exposure control circuit 16; a group of contacts PC are connected to a CCD processing circuit 18; a group of contacts PD are connected to an AF motor control circuit 20; a group of contacts PE are connected to an AF pulser 21 and, a group of contacts PF are connected to a Dx input circuit 13. As previously mentioned, the CCD processing circuit 18 is connected to the AF CCD 17, and the AF motor control circuit 20 is connected to the AF motor 19 in the body.

Terminal $P_{20}$ of the main CPU 10 is connected to a first AF switch SWAF1, which operates to change a focussing mode between an AUTO MODE by means of the AF motor drive and a MANUAL MODE by means of a manual operation of the lens by a user. Terminal $P_{21}$ is connected to a second AF switch SWAF 2 which operates to change a shutter release mode between a focus-priority mode and a release-priority mode. The first and second AF switches SWAF1, SWAF2 are arranged so as to be sequentially operated so that, when the first AF switch SWAF1 selects the MANUAL MODE, the second AF switch SWAF2 changes to the release-priority mode.

Lens Circuit

Figure 3B:
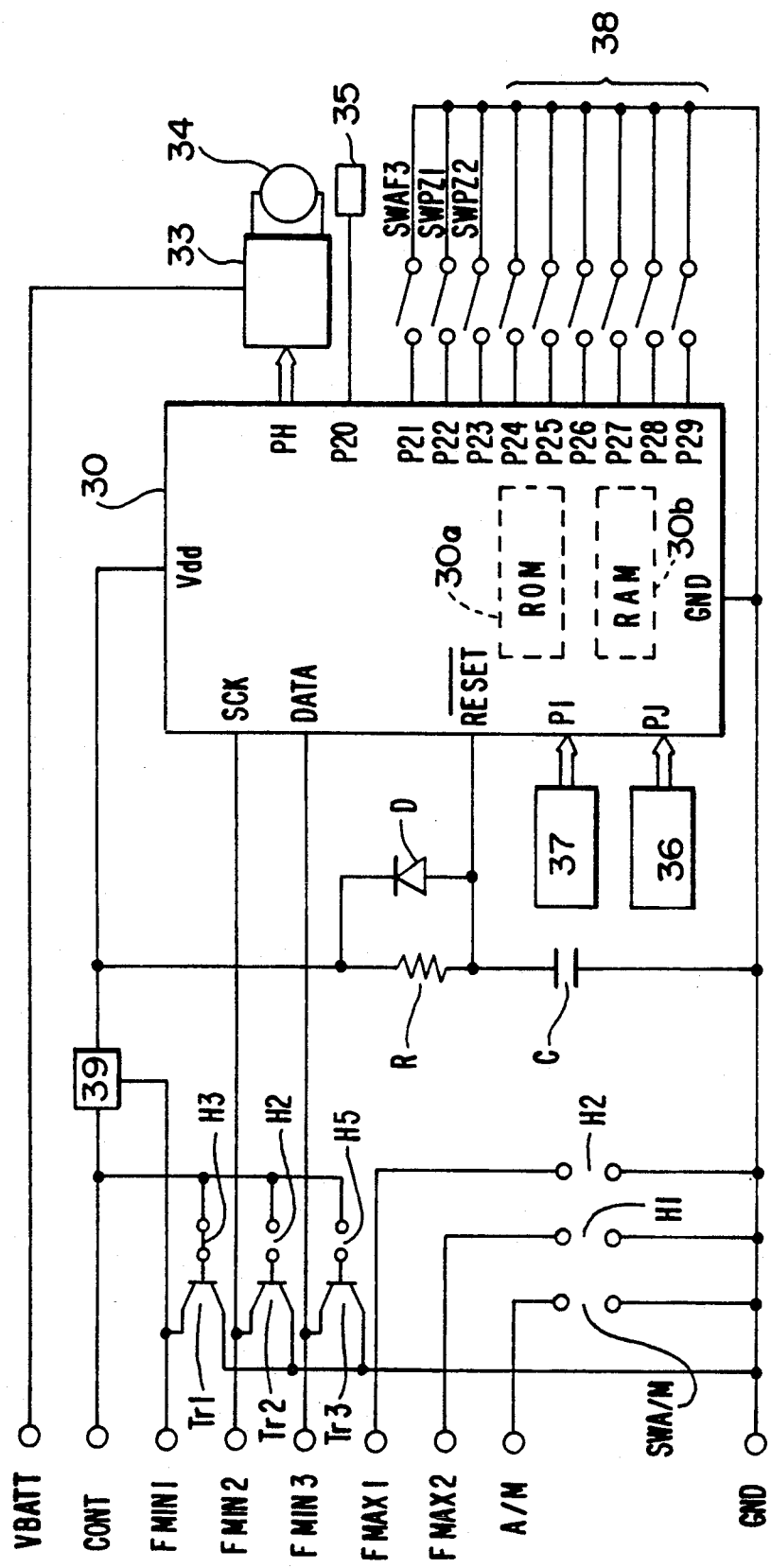
FIG. 3B is a circuit diagram of a lens of the camera system of FIG. 1.

FIG. 3B illustrates a circuit in the lens barrel 2.

First, each circuit and connection between switches and the lens CPU 30 will be explained hereinbelow.

The PZ motor drive unit 33 is connected to a group of terminals PH of the lens CPU 30 so as to be controlled thereby. A pulser 35 generates a pulse when the motor 34 rotates and inputs the pulse generated to the lens CPU 30 through the terminal P20.

The terminals P21 to P29 of the lens CPU are respectively connected to a third AF switch SWAF3, for changing the automatic focus on the lens between AUTO and MANUAL, a zoom change-over switch SWPZ1 which determines whether zooming is to be performed automatically by the motor or manually; an image magnification rate switch SWPZ2 for setting a constant image magnification control for achieving an automatic zooming in accordance with a displacement of the camera relative to an object so as to maintain an image magnification of the object at a constant value; and six switches of the zoom operation code plate 38 that issue a rotational direction and speed of the PZ motor 34. The six switches will be explained later.

Terminal groups PI and PJ of the lens CPU 30 are connected to the zoom code plate 36 and the distance code plate 37, respectively, so as to input object distance information and focal distance information in accordance with the actual lens condition.

Contacts relative to the body will now be explained below.

These contacts are connected to respective contacts on the body as being identically named when the lens 2 is mounted on the body 1. In this system, the body side is provided with a terminal Vdd so as to accommodate a conventional lens, but the lens side is not provided with a corresponding contact.

Contact VBatt at the lens side is connected to the PZ motor drive unit 33 so that electricity is directly supplied from the battery 22 inside the camera body to the PZ motor 34 by means of a switching operation of the drive unit 33.

Contact A/M at the lens side is connected to contact Gnd at the lens side through a diaphragm switch SWA/M for changing the AUTO/MANUAL mode of the diaphragm sequentially in connection with the rotational movement of the diaphragm ring at the lens side.

Contact Fmax1 and Fmax2 at the lens side are selectively connected to ground through fuse set portions H1 and H2 as a fixed information portion similar to that provided on a conventional AE lens, which will be explained later. Thus, information of the maximum F number (smallest aperture of the diaphragm) in Table 2 is provided to the body side depending upon the combination of intermittence of the fuse.

TABLE 2

| F No. | Fmax2 | Fmax1 |
|---|---|---|
| 22 | 0 | 0 |
| 32 | 0 | 1 |
| 45 | 1 | 0 |

Terminals Fmin1, Fmin2, and Fmin3 at the lens side provide full-open F number (smallest F number, largest aperture of the diaphragm) in 3 bits and are used as an input/output terminal for the lens CPU 30. In order to effect this common use, these contacts are connected to PNP transistors Tr1-Tr3. An emitter of each transistor is connected to respective Fmin1, Fmin2, and Fmin3 contacts, with the base thereof being connectable to the CONT contact through fuse-set portions H3, H4, and H5, while a collector thereof is being connected to the Gnd contact. Alternatively, the fuse can be positioned between the emitter and Fmin contact.

In order to obtain information of the aperture of the F number, the electrical potential of the CONT contact is made to be the same as that of the Gnd contact so that the fuse will make the transistor which is in a connected state ON, and the three contacts Fmin1, Fmin2, and Fmin3 are made to be "H" (High level). Thereby, in this embodiment, the contact Fmin1 in a connected state is L(low level), while the contacts Fmin2 and Fmin3 are "H". That is, this achieves a construction in which each contact appears to be provided with respective memory cells of a ROM, so that each contact is able to store information in one bit by means of intermittence of a fuse connected to a base of each of the transistor.

The correspondence between each full-open F number and each contact is shown in Table 3.

TABLE 3

| No | Fmin3 | Fmin2 | Fmin1 |
|---|---|---|---|
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

Contact CONT on the lens side is connected to the above transistor and is arranged so as to supply electric power to a Vdd terminal of the lens CPU 30 through a switching circuit 39 and to a reset circuit that comprises a resistor R, a diode D and a capacitor C. The switching of electric power supply from the CONT terminal is performed by the Fmin1 terminal on the lens side, so that electric power can be supplied to the lens CPU 30 by setting the CONT contact "H" while Fmin1 contact is at "L" after having provided information about the full-open F number.

The reset circuit is provided with a predetermined time constant by means of the resistor R and the capacitor C, and it is hence capable of starting a program of the lens CPU by changing a RESET terminal of the lens CPU 30 from ACTIVE ("L") TO NONACTIVE ("H") when a predetermined amount of time has passed after activation of the Vdd and voltage of the power becomes constant.

Contact Fmin2 on the lens side is connected to the SCK terminal of the lens CPU 30, which outputs clock signals to the display CPU 11 on the body side for serial communication. Contact Fmin3 is connected to a DATA terminal of the lens CPU 30 to achieve serial data transmission.

Figure 4:
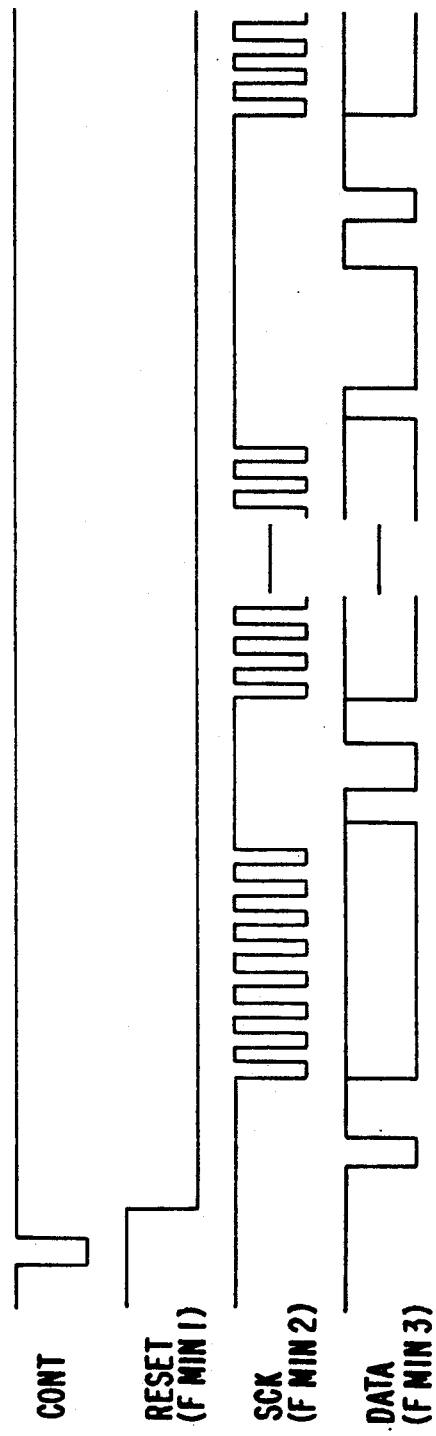
FIG. 4 is a timing chart illustrating command and data communication between the body and the lens.

The system of communication between the lens and the body is shown in a timing chart in FIG. 4.

As mentioned above, the body side actuates the lens CPU 30 to reset itself by making the CONT terminal "H" while making the Fmin1 terminal "L," when information of the full-open F number has been read by the CONT terminal "L." When the reset mechanism has been released, the body side changes the DATA terminal from "L" to"H" after confirming that the DATA (Fmin3) terminal at the lens CPU side is "H" (NOT BUSY), so as start communication relative to the lens CPU 30. The CONT and RESET terminals hold their given condition once the lens CPU 30 was started.

The lens CPU 30 outputs a clock signal from the SCK terminal so as to input a command from the body side by means of the DATA line. If the data constitutes a necessary command, the lens CPU 30 outputs an acknowledgment signal, and thereafter, data transfer will be achieved.

Normally, when communication has been completed, the lens CPU 30 changes the DATA terminal to "H" once after making it "L" and thereafter transmits completion of communication to the body side.

Data pertaining to communication between the lens and the body are shown in Table 4.

TABLE 4

| lens→body | | | |
|---|---|---|---|
| AF information | | | 0011.0001(31H) |
| AE information | | | 0011.0010(32H) |
| all data | | | 0011.0011(33H) |
| each single bite | | | 0101.XXXX(5XH) |
| lens information 1 | | | 0110.0000(60H) |
| lens information 2 | | | 0110.0001(61H) |
| body→lens | | | |
| focal length information fWide | | | 0110.0010(62H) |
| focal length information fTele | | | 0110.0011(63H) |
| focal length information fX(present) | | | 0110.0100(64H) |
| lens drive information | | | 0110 0110(66H) |
| lens accommodation | | | 1001.0000(90H) |
| lens return | | | 1001.0001(91H) |
| PH ON | | | 1001.0010(92H) |
| PH OFF | | | 1001.0011(93H) |
| | lens info. 1 | lens info. 2 | lens drive info. |
| | 60H | 61H | 66H |
| Bit7 | PH demand | LENS CPU | fw end |
| Bit6 | AF A/M | | fT end |
| Bit5 | PZ A/M | PZ in LENS | |
| Bit4 | PZ P/A | | |
| Bit3 | PZ MODE | | PZ Far |
| Bit2 | SET SW | | PZ Near |
| Bit1 | LENS A/M | LENS | |
| Bit0 | LENS O/C | version | |

The zoom operation code plate 38 will now be explained hereinbelow.

The lens 2 is constructed so that the zoom operation can be performed either by the MANUAL MODE or MOTOR DRIVEN MODE. It is, however, arranged so that the zoom operation, by means of the motor driven mode can be performed with a feeling similar to that obtained during the manual mode operation. To this end, the operation ring 51 is provided around the center periphery of the lens barrel so that the direction (TELE, WIDE) and speed of zooming can be determined by means of the rotational operation of the operation ring 51.

Although mechanical construction will not be explained in detail, it should be noted that the operation ring 51 is rotatable from the neutral position in opposite rotational directions and is also biased by means of a pair of springs 53 so that it returns to the neutral position when the user releases it. The operation ring 51 is provided with four brushes. A stationary barrel (not shown) rotatable relative to the operation ring 51 has the code plate 38 fixed thereto, which is adapted to change its state of conduction due to a slidable movement of the brushes.

Figure 5:
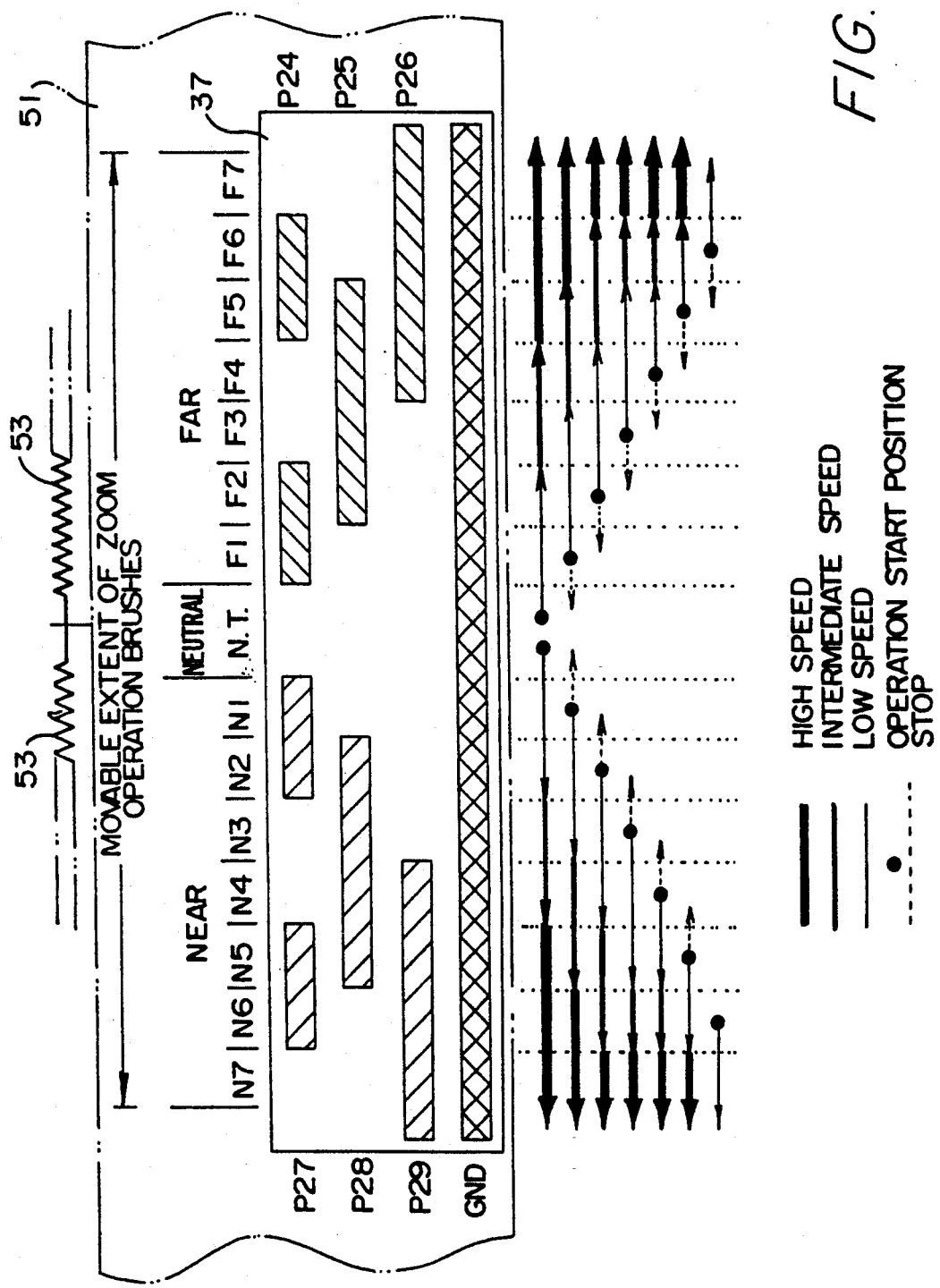
FIG. 5 is an illustration of correspondency between a pattern of a zoom code plate and a operational zoom speed.

The code plate 38 is formed, as shown in FIG. 5, with a land on the ground and three conduction lands each on the TELE (FAR) side and WIDE (NEAR) side. When compared with the construction in FIG. 3, the lands on the FAR side correspond to terminals P24~P26 and the lands on the NEAR side correspond to terminals P27~P29, respectively.

The brushes sliding on the code plate 37 function to communicate any communication lands with which the brushes come into contact with in their displacement position with the land on the ground so that, upon communication, a signal "1" is inputted to terminals to P24~P29 of the lens CPU 30, while, upon non-communication, a signal "0" is input to terminals P24~P29. In accordance with this communication and non-communication, 7 kinds of signals are output from each FAR and NEAR side on the opposite sides of the neutral position in correspondence with a given rotational position. These signals are transformed into single bit data for use in a process in which the direction and speed of zooming are selected.

Zoom speeds determined by the initial operational position and rotational angle are shown below the code plate 37 in FIG. 5. Though the way to determine the zoom speed will be explained later with reference to a flow chart, a brief explanation thereof will be given below.

When the operation ring 51 is rotated from the neutral position towards the FAR side, the zoom speed becomes low if the rotational angle is equal to or less than F2. At a greater rotational angle, the zoom speed becomes moderate in the case of F3 and F4, while the zoom speed becomes high in the case of F5. When the operation ring 51 is actuated from the neutral position, the zoom speed can be determined solely by a rotational angle as a parameter, as mentioned above.

The procedure in a case in which the initial operational position is not neutral will be explained below.

The power zoom device is constructed so as to stop the zooming mechanism when the operation ring is moved towards a smaller code number, i.e., closer to the neutral position (NT), regardless of the amount of rotational angle from the neutral position, so that it is capable of stopping the lens at a desired focal length at any zoom speed.

For example, if the operation ring 51, which has been displaced to the F6 position from the neutral position for the purpose of high speed zooming, is returned to the F5 position, the motor 34 is stopped. A case in which the operation ring 51 is again rotated from F5 to F6 for the purpose of FAR side zooming is to be considered here. If zoom speed is determined simply by the amount of rotation of the operation ring from the neutral position, the lens abruptly resumes a high speed zooming due to the rotational operation thereof from the F5 position to the F6 position.

With such a construction, if it is intended to perform fine adjustments after one stoppage of the zoom lens which has been moved to a position just before a desired focal length by means of a high speed operation, the lens still tends to perform a high-speed zooming so that it becomes difficult to perform such a fine adjustment. On the other hand, if the user returns the operation ring 51 to the neutral position even once for the purpose of performing the zooming operation, it is time-consuming.

Accordingly, a camera of this embodiment is constructed so that the zooming speed can be determined not only by the amount of rotation of the operation ring 51 from the neutral position, but also by the initial operational position, i.e., the position from where zooming starts. With this construction, a fine adjustment adjacent to a desired focal length can be performed without any time-consuming operation, such as temporarily returning to the neutral position.

Figure 6:
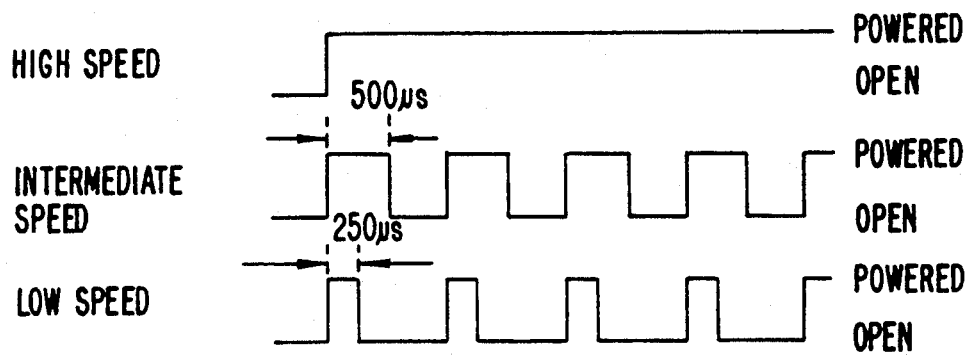
FIG. 6 is a timing chart of a PWM control for modifying a zoom speed.

FIG. 6 illustrates an example in which PWM (Pulse Width Modulation) is used as a means for varying the above zooming speed. Considering the unit of a single period of pulse to be 1 ms, power is supplied continuously during high speed zooming while achieving a 50 percent duty ratio at an intermediate speed, and a 25 percent duty ratio at a low speed. These values are given as examples and are not the only possible ones. By virtue of this, the rotational speed of the PZ motor 34 will be changed so as to properly adjust the zooming speed.

Figure 7:
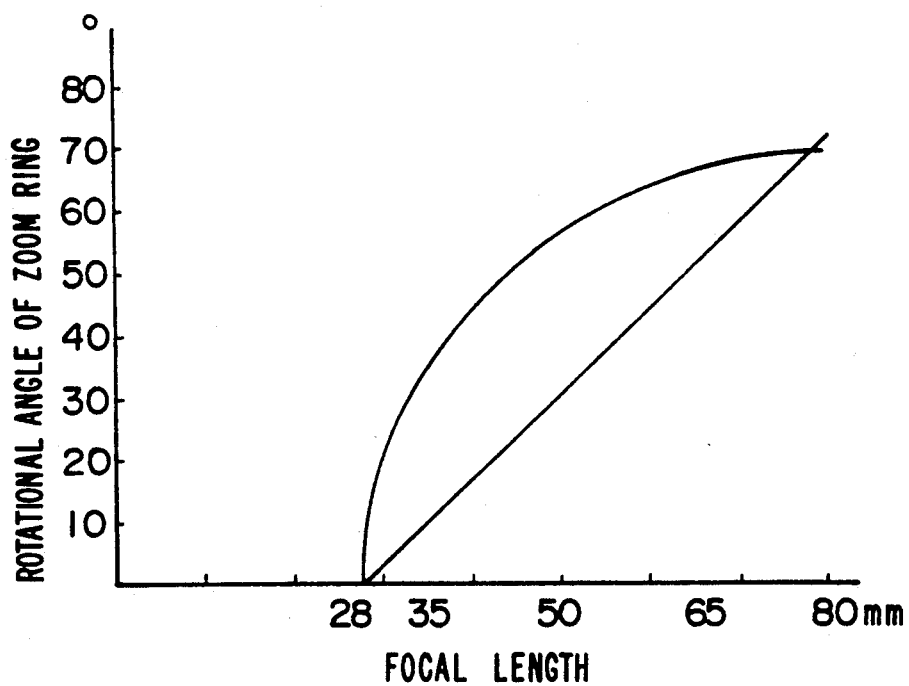
FIG. 7 is a graph showing the relationship between a rotational angle of a zoom ring and the change in a focal length.

It should be appreciated that the relationship between the amount of rotation of a zoom ring and the variation of a focal length is not linear. A representative example of a curve between the amount of rotation and focal length is shown in FIG. 7.

In such a zoom lens, if a constant speed zooming is performed by a motor, the focal length will be changed slowly on the WIDE side, while, on the FAR side, it will be abruptly changed. For users, such zooming, which represents an uneven change in the focal length will not be convenient in terms of manipulation. It will be more convenient for users if relatively even or averaged change in focal length, as illustrated by a straight line in FIG. 7, is obtained.

The non-linear characteristic of focal length change in zooming, however, inherently occurs when it is intended to design cams of the zoom lens so as to maintain a constant rotational torque of the zoom ring. Therefore, if it is intended to obtain a linear characteristic as shown in FIG. 7 by means of mechanical construction, the rotational torque of the zoom lens will be changed. This will not be desirable, either.

The camera according to this embodiment is intended to solve the above problems by improving the control system of a motor, while maintaining the above curvature characteristic between the rotational angle of the zoom ring and focal length changes. That is to say, a constant change in focal length can be obtained, even in a case in which a constant speed zooming command is given to the camera, by constructing a control circuit for zooming so that the motor is automatically controlled to be driven rapidly at the WIDE side, while, on the TELE side is driven slowly.

Assuming that the rotational angle of the zoom ring and focal length are $\alpha$ and $x$, respectively, and the curvature in FIG. 7 is expressed by $\alpha = f(x)$, the differential thereof, f'(x), represents a rate of change in curvature at a given focal length. Since the focal length inputted from the length code plate 36 is divided into increments 1~m, the relation between a representative rate of change at n-increment f'(xn) and the maximum rate of change f'(xmax) in all increments will be expressed as:

$$\beta = f'(xn)/f'(xmax)$$

A constant rate focal length change at a given speed can be obtained by multiplying β by the power supply time of the PWM determined by the above speed data. Correction data of each of the increments may be stored in ROM 30a of the lens CPU 30 so as to obtain any correction data corresponding to the focal length data detected by the zoom code plate 37.

There will be some possibility that the PZ motor 34 will be made to stop if the power supply time is extremely short. Accordingly, it is preferable to give a limit to the correction data as a safety precaution.

SYSTEM FLOW CHART

The aforementioned components of the system operation is described below using FIGS. 8 through 22. Each program of the display CPU 11, the main CPU 10 and the lens CPU 30 are described separately.

THE DISPLAY CPU

Figure 8:
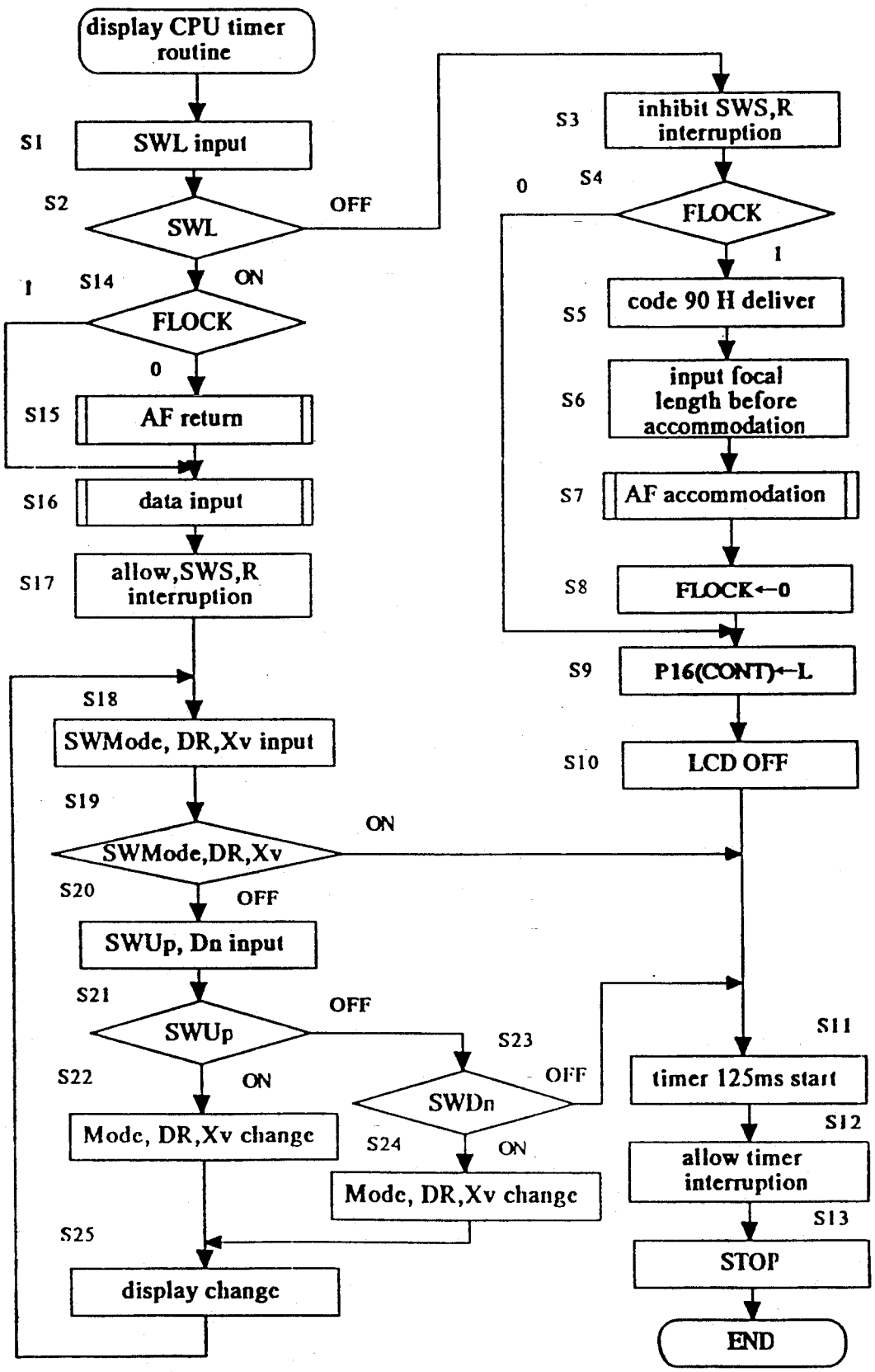
FIGS. 8 to 13 are flow charts illustrating the operation of a display CPU of the body.

FIG. 8 shows a timer routine for the display CPU 11. This process is executed by the display CPU 11 according to the program stored in an internal ROM of the display CPU 11.

The display CPU 11 checks the ON/OFF condition of the lock switch SWL in Steps S1 and S2 (shown as only S in the figure). If lock switch SWL is OFF, switch interruption is disabled in step S3, and it is determined whether the lens enclosure has been completed, based upon the condition of flag FLOCK.

As mentioned above, it is more convenient to carry these lenses if they are as compact as possible when accommodated. Therefore, the camera is designed so that the lens is automatically retracted with the most compact condition by automatic focusing and power zooming at the time the lock switch SWL is turned OFF.

However, if the lock switch SWL is turned OFF without any intention of enclosure, for instance, when the user needs to leave the camera temporarily with the focal length and focusing unchanged, then it will result in an unfavorable condition when the lock switch SWL is turned OFF for power saving and automatic accommodation is executed.

Therefore, when the lock switch SWL is changed from ON to OFF to execute an automatic accommodation, this camera memorizes the conditions before the accommodation, and directs itself to return to the conditions before accommodation when the lock switch SWL is ON.

Such a design can be used without inconvenience even when the lock switch SWL is OFF for accommodation or for other purposes.

In this system, accommodation for the AF and the resumption of its position prior to accommodation are executed by the main CPU 10, while the accommodation for PZ and its resumption are executed directly by the lens CPU 30. However, the main CPU 10 and the lens CPU 30 are activated only when necessary. When unnecessary, because power is not supplied to them, the display CPU 11, which operates all the time, controls the data for accommodation and resumption of initial position. In this example, the lock switch SWL functions as the means for changing the states between the accommodated and ready-for-photographing positions.

Figure 9:
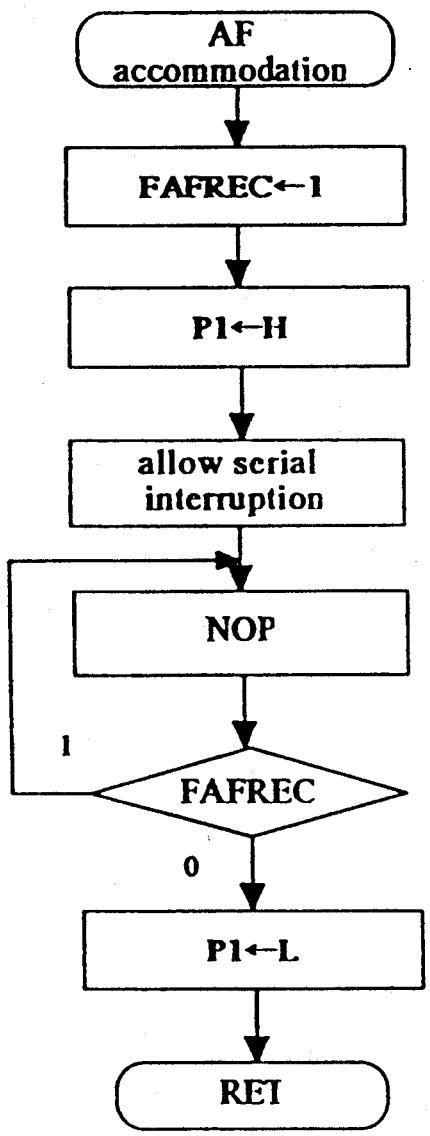

Steps S5 through S8 are processes for the lens accommodation. The process for zooming is executed by sending an accommodation (retraction) command to the lens CPU 30 and by obtaining focal length data before accommodation from the lens CPU 30. The AF process AF is executed by activating the main CPU 10 by the AF enclosure subroutine, as shown in FIG. 9. The AF accommodation will be described later.

When the lens accommodation is completed, flag FLOCK is set to "0" (Step S8). If the lens accommodation has already been completed, the process is skipped because flag FLOCK is "0." Power supply for the lens CPU 10 is turned OFF by changing P16 (CONT) to "L" in Step S9, and power for the LCD panel 12 is turned OFF in Step S10. Then, the timer is set to execute the timer routine intermittently at an interval of 125 ms in Steps S11, S12 and S13, and the process stops. This intermittent process is repeated while the lock switch SWL is OFF.

Figure 10:
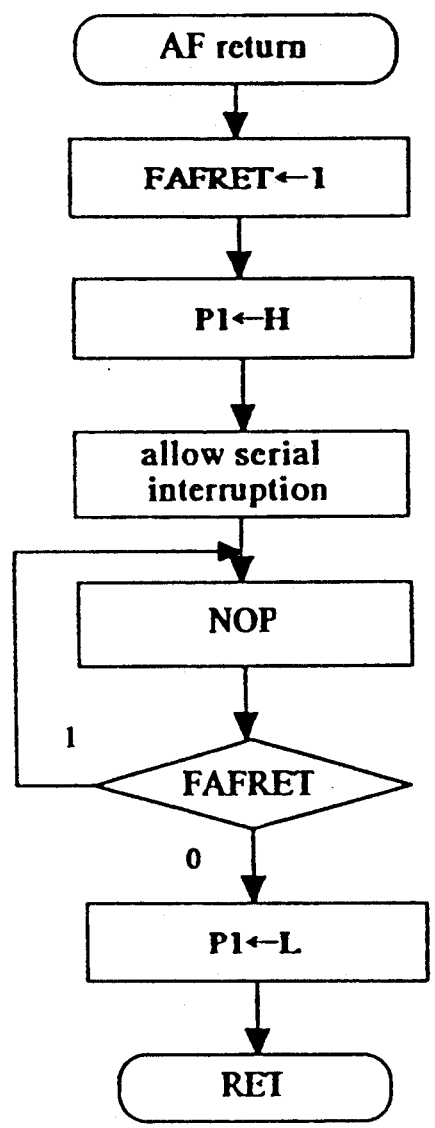

When the lock switch is ON, the display CPU 11 checks the condition of flag FLOCK in Step S14, and if it is "0," it returns the lens focus condition to the condition before accommodation by having the main CPU 10 execute the AF resumption process of FIG. 10.

In Step S16, the kind of lens being mounted to the body is checked by calling a data input process, as shown in FIG. 12, and if necessary, the resumption of the position of the zoom lens for use is executed.

When the above-mentioned subroutine is completed and the execution is returned to the timer routine, the display CPU 11 enables switch interruptions in Step S17 and advances the process to Step S18.

In Steps S18 through S25, the process involves changing the mode and altering its display according to the operation of the as mode switch SWMode, drive switch SWDR, exposure compensation switch SWXv, up switch SWUp, and down switch SWDn.

When the mode switch and other switches are not in operation, one process ends by executing the above-mentioned Steps S11 through S13.

Figure 11:
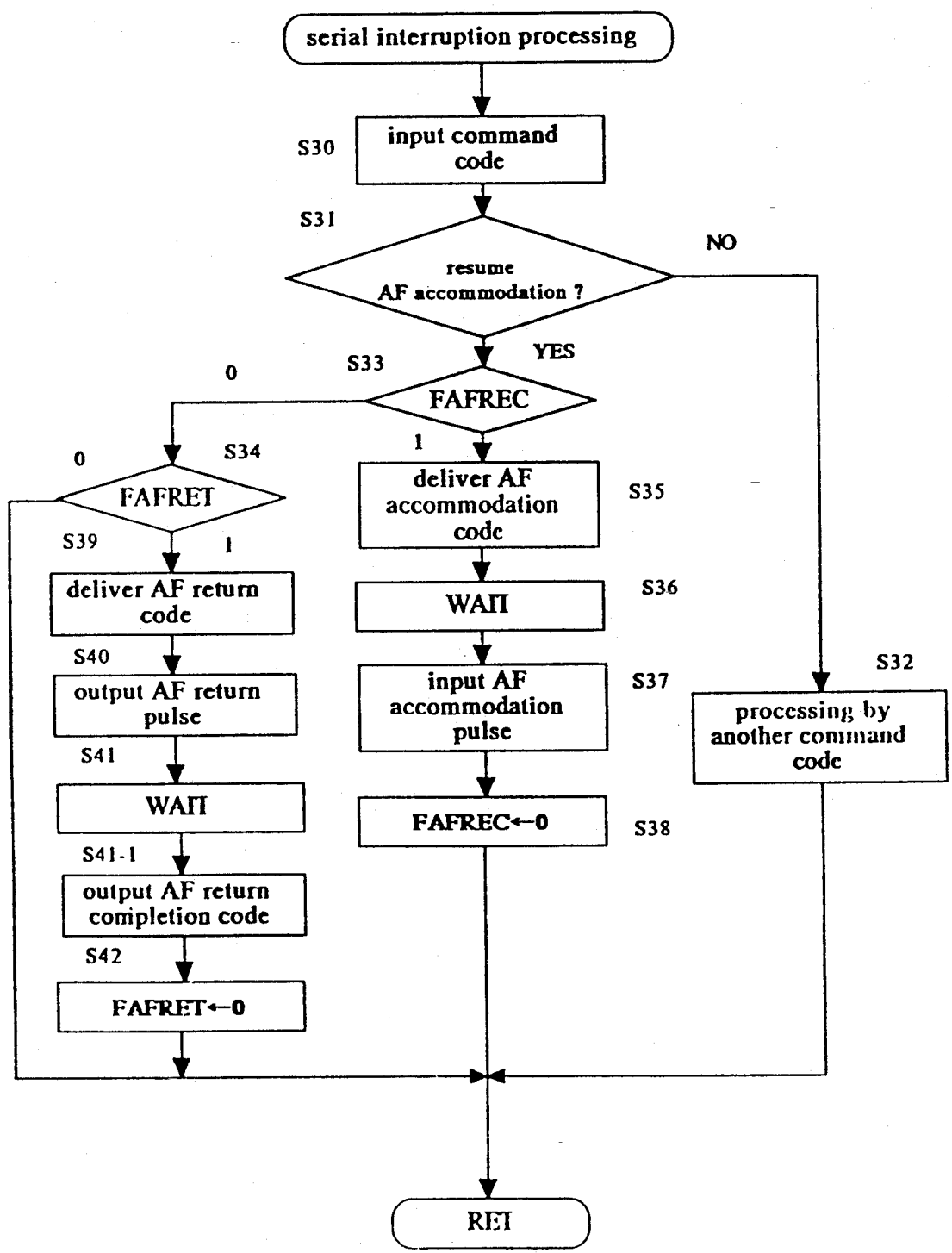

Next, the above-mentioned AF accommodation and resumption process, as well as a serial interruption processing shown in FIG. 11, are described.

Both the accommodation and resumption processes are to wait for flags FAFREC (enclosure) and FAFRET (resume) until they are cleared by executing a serial interruption. These flags have been set at the first step by changing P1 to "H" to turn ON the DC/DC converter 25 to start the main CPU 10.

The serial interruption process is executed when there is an interruption from the main CPU 10. A command code is entered in Step S30, and if it is judged to be other than the AF accommodation or the resumption process in Step S31, the process of the command code is executed in Step S32.

If the command code is for either the AF accommodation or the resumption process, it is determined whether it is the AF accommodation or the resumption process, based upon the flag condition in Steps S33 and S34. In case of accommodation, an AF accommodation code is sent to the main CPU 10 in Step S35. In Steps S36 through S38, the amount of rotation necessary for accommodation of the AF motor 19 is entered as the number of pulses from the AF pulser 21. Then the flag FAFREC is cleared and execution returns to the process that called it.

In the case of the resumption process, an AF resume code is sent to the main CPU in Step S39, and in Steps S40 through S43, the number of pulses that was entered before the accommodation is sent as the number of pulses for the resumption process. It waits until the resumption process is completed, clears flag FAFRET, and then the process starts over again after having received a resume completion code from the main CPU 10.

Figure 12A:
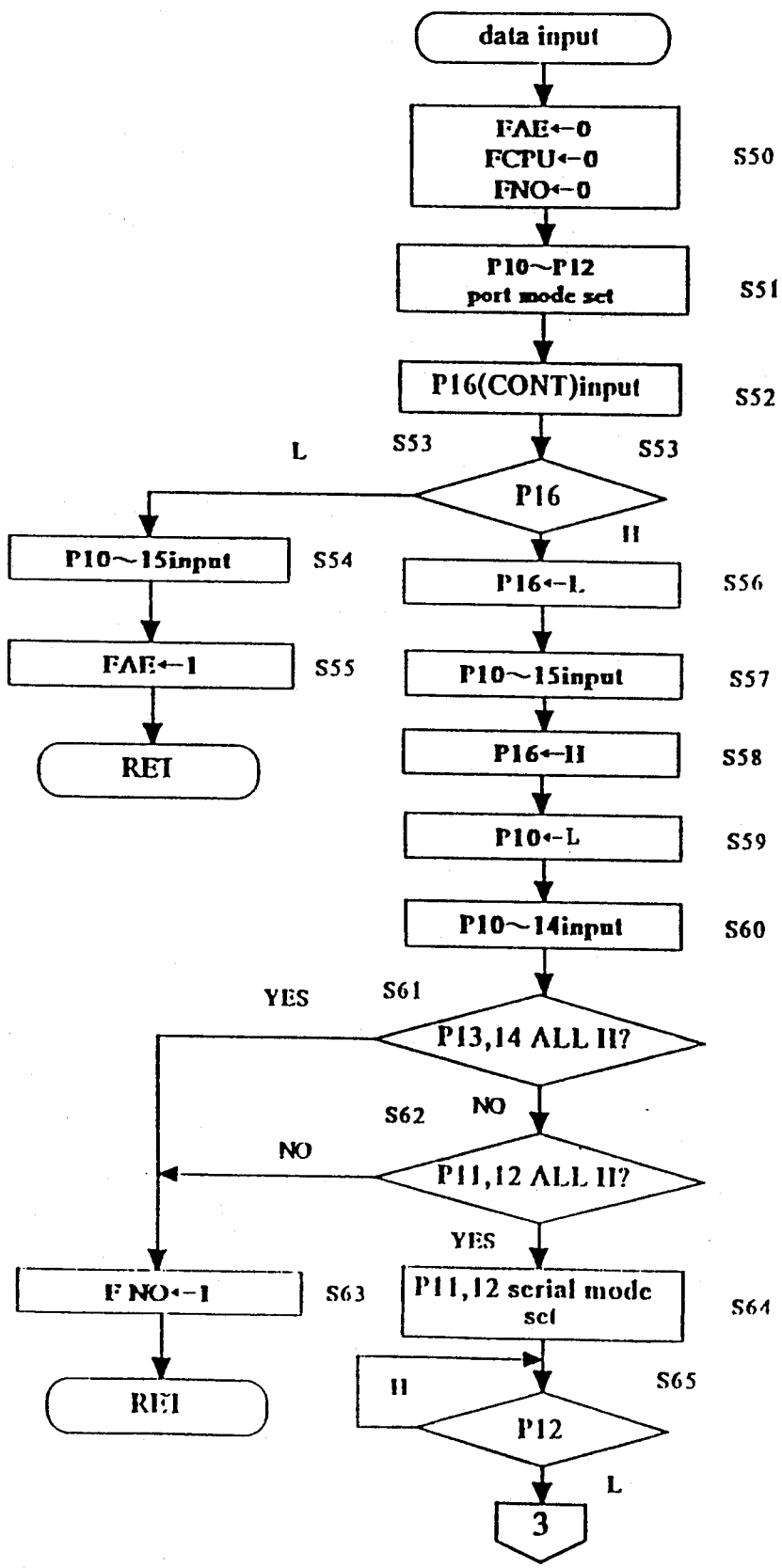
Figure 12B:
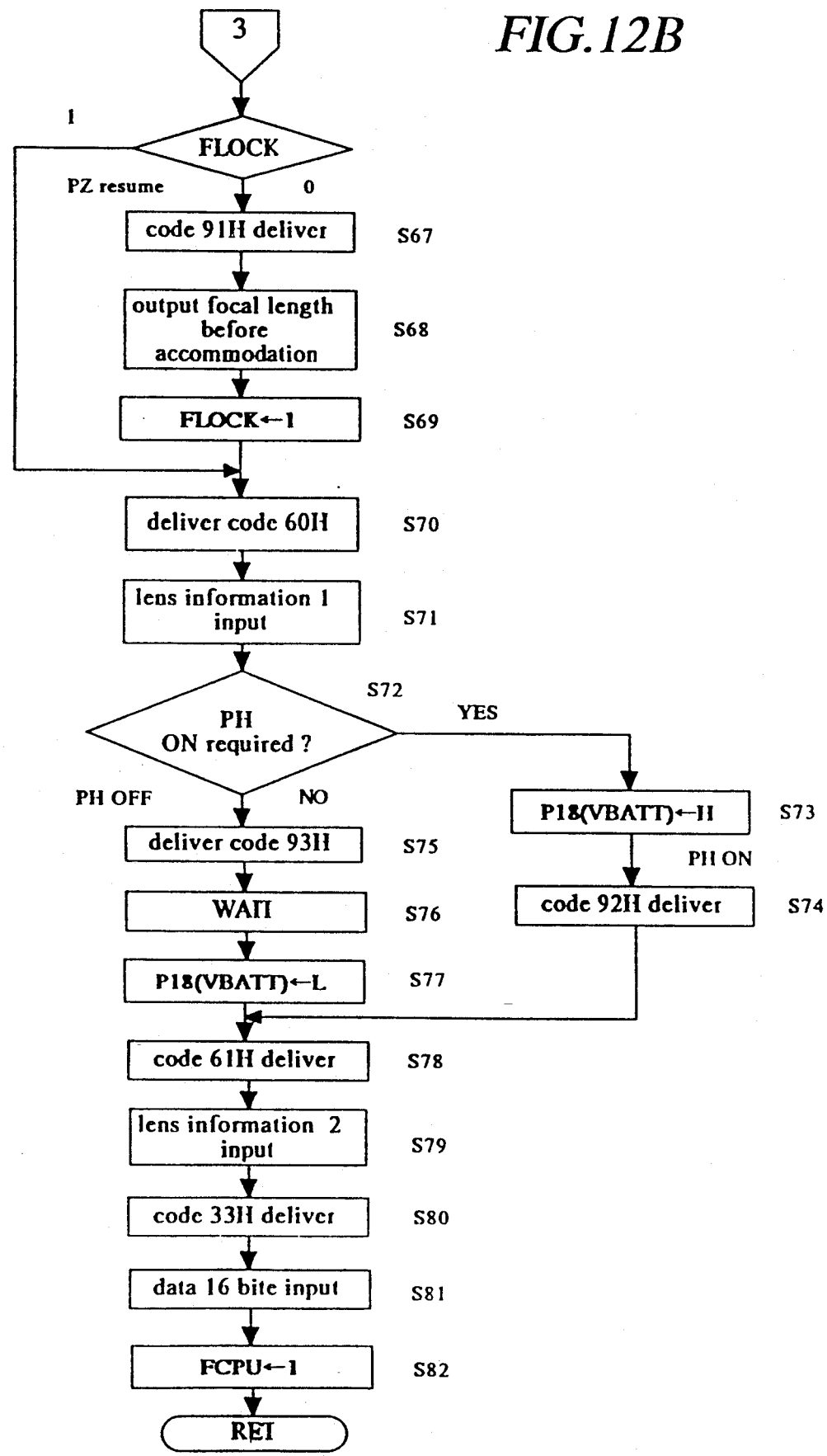

As shown in FIGS. 12A and 12B, the subroutine for data input that is called in Step S16 of the timer routine clears all three flags FAE, FNo. and FCPU, which are used to determine the lens in Step S50.

In Step S51, each port P10 through P12 used to communicate with the lens is changed to an input mode, and the level of the Cont contact point P16 is entered and measured. When an AE with no Cont contact point is mounted, the Cont contact point of the body makes a contact with the mount ring causing a ground voltage (L). Because of this, the minimum (full opening) and maximum F numbers, and the aperture A/M selection are read in as a 6-bit parallel data in Step S54. In Step S55, flag FAE showing the use of an AE lens is set, and then the execution returns to the timer routine.

When the level of the Cont terminal P16 is "H," it is reset at the "L" level in Step S56, and the levels of terminals P10 to P15 are inputted in Step S57. When a lens shown in FIG. 3B is mounted, the transistor connected to contact point Fmin1, Fmin2, and Fmin3 is turned ON in this step, and the open F number is inputted.

Then, in Steps S58 and S59, P16 (CONT) is set "H," and P10 (Fmin1) is set "L." This makes power supplied to the lens CPU 30 from the CONT terminal of the body, and after a certain period of time, the reset is released and the lens CPU 30 starts operating.

In Steps S60 through S63, if both ports P13 and P14 are "H," it is determined that a lens is not mounted, flag FNO is turned ON and the execution returns. As shown in Table 2, it is so designed that either terminal P13 or terminal $P_{14}$ (Fmax) becomes "0."

When a lens is mounted, the judgment in Step S61 becomes negative. The contact point levels of terminal P10 to terminal $P_{12}$ are detected after setting the Cont contact point to "H." If the level of any contact point detected is "L," the lens CPU 30 is judged a failure. Flag FNO is turned ON in Step S63 and the execution returns. This is because all of the terminals P10 to P12 maintain the "H" condition at the communication-wait state of the lens CPU 30.

Contact points Fmin2 and Fmin3 are changed from the port mode to the serial communication mode in Step S64, and wait until the lens CPU 30 becomes ready for communication in Step S65.

When the lens CPU 30 becomes ready for communication, if the flag FLOCK is "0," a command code for resumption of the PZ initial position is sent to the lens CPU 30 in Steps S67 and S69 to output the focal length data before enclosure. Then, flag FLOCK is set to "1" and execution proceeds to the next process.

As mentioned above, flag FLOCK is set to "0" right after the lock switch is changed from ON to OFF, and is set to "1" right after the lock switch is changed from OFF to ON.

In Step S70, a command code 60H is sent to the lens CPU 30, which is synchronized with a clock from the lens CPU 30. This code is to receive lens information including switch positions of the lens and power hold request, etc., as shown in Table 4. Such lens information is inputted in Step S71.

When a power hold request from the lens CPU 30, based on the input data is detected in Step S72, terminal P18 (VBATT) is set to "H," and the power supply to the PZ motor drive 34 in the lens is started in Steps S73 and S74. Then, a command code 92H, informing a power hold, is sent out to the lens CPU 30.

When no power hold is requested, a command code 93H, informing a power hold cancellation, is sent to the lens CPU 10 in Step S75, and the PZ motor is turned OFF by lowering the VBATT to "L" in Step S77 after a certain period of time has elapsed.

In Steps S78 through S81, data is entered from the lens by command codes 61 and 33. In Step S82, flag FCPU is set to "1", showing that a lens with a lens CPU is mounted, and then the execution returns to the timer routine.

Figure 13:
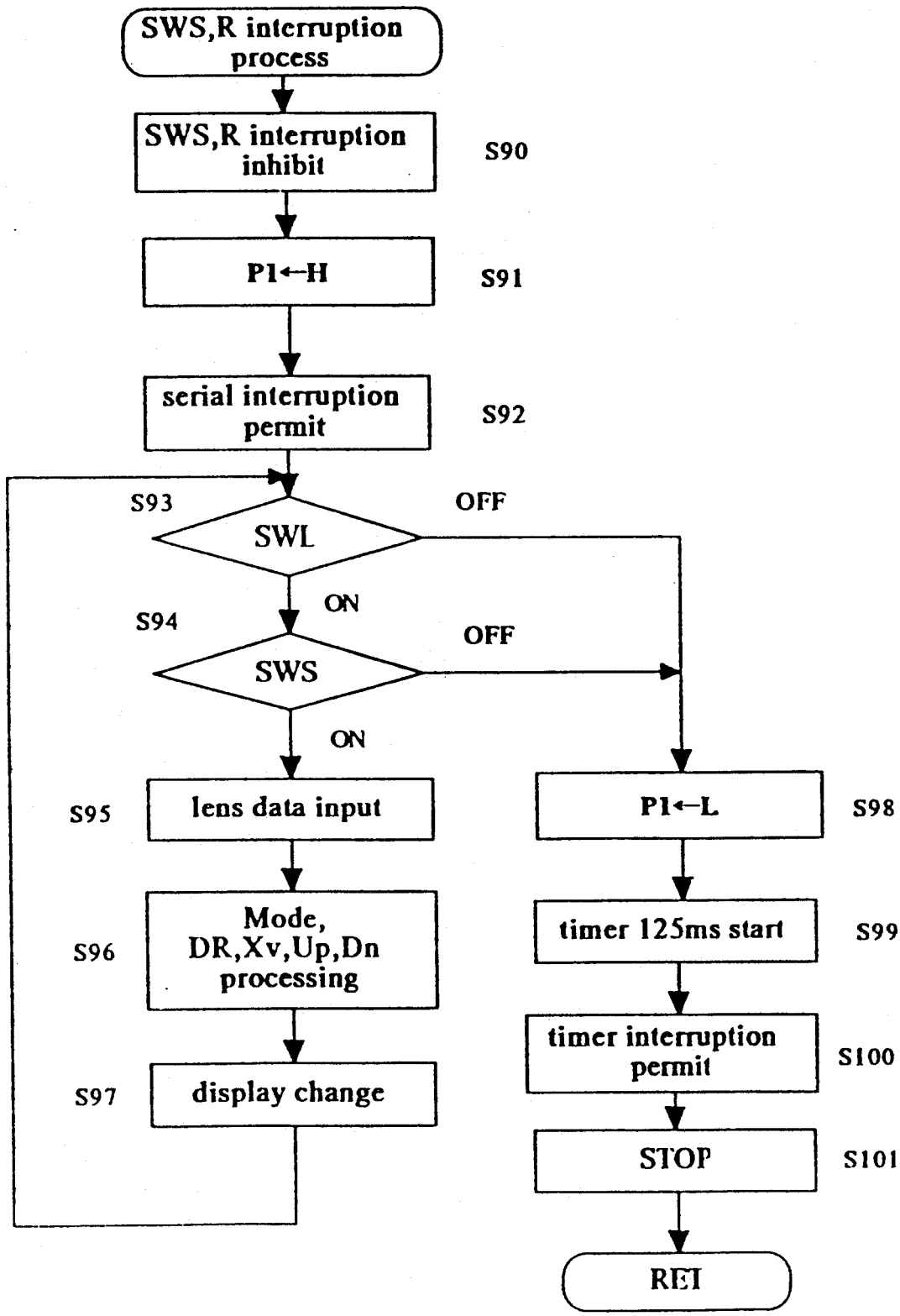
Figure 18:
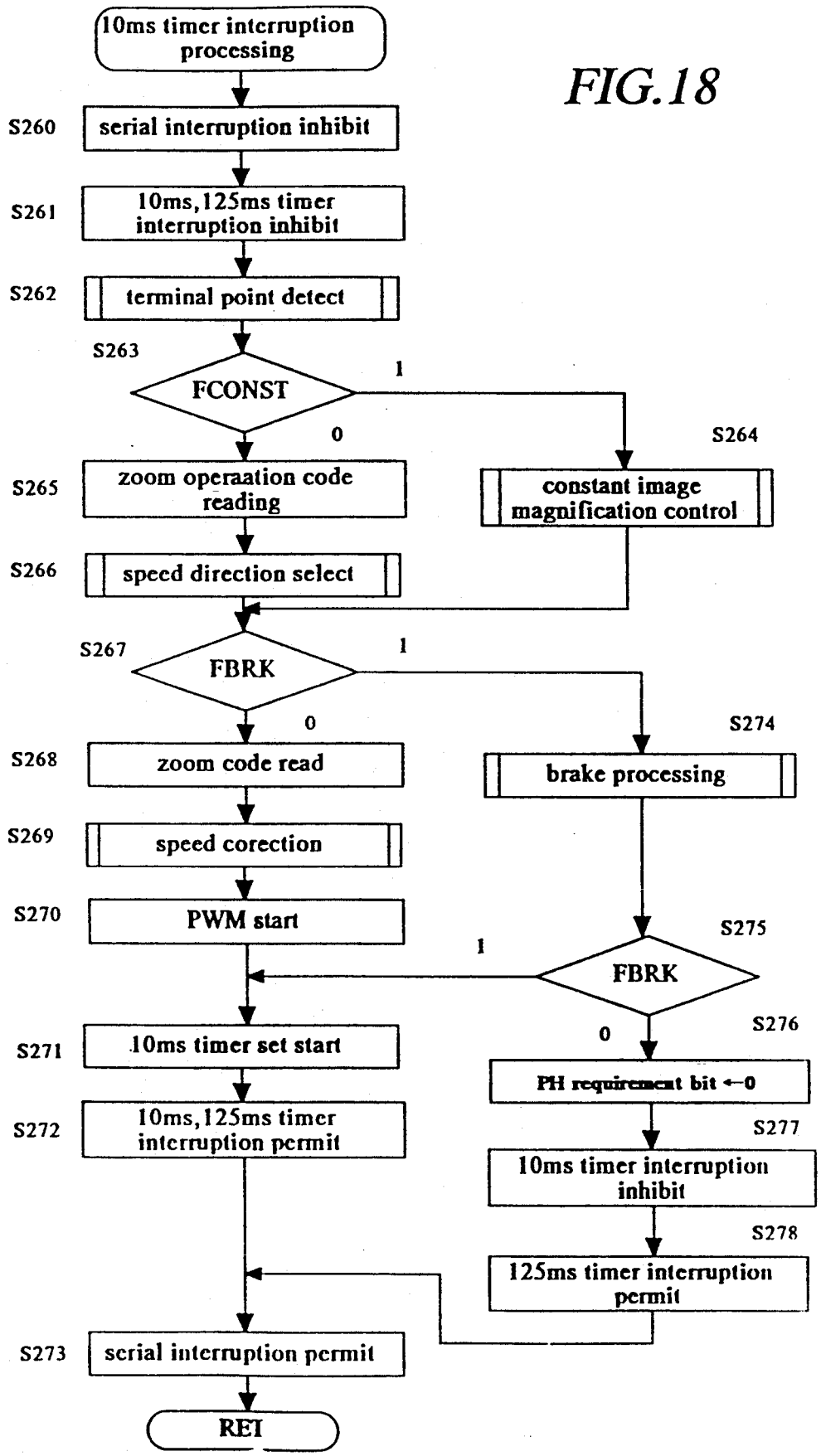

FIG. 13 shows a subroutine for an interruption process by SWS, and SWR of the display CPU 11. When the light-measuring switch SWS and the release switch SWR are ON while an SWS, SWR interruption is enabled in the above-mentioned timer routine, an interruption process is executed by the lens CPU 30, as shown in FIG. 18.

In this switch interruption process, another switch interruption is disabled in Step S90, the main CPU 10 is turned ON in Step S91, and the aforementioned serial interruption is enabled in Step S92.

While both the lock switch SWL and the light-measuring switch SWS are ON, the processes in Steps S93 through S97 are repeated to input the information that frequently changes from the lens ROM and lens CPU 30. And, setting alteration processes for the same mode, drive and exposure compensation, such as those shown in Steps S18 through S25 in the timer routine, are executed.

If either one of the lock switch SWL or light-measuring switch SWS is OFF, the power supply to the main CPU 10 is turned OFF, the timer is set, timer interruption is enabled, and execution is terminated in Steps S98 through S101.

THE MAIN CPU

Figure 14A:
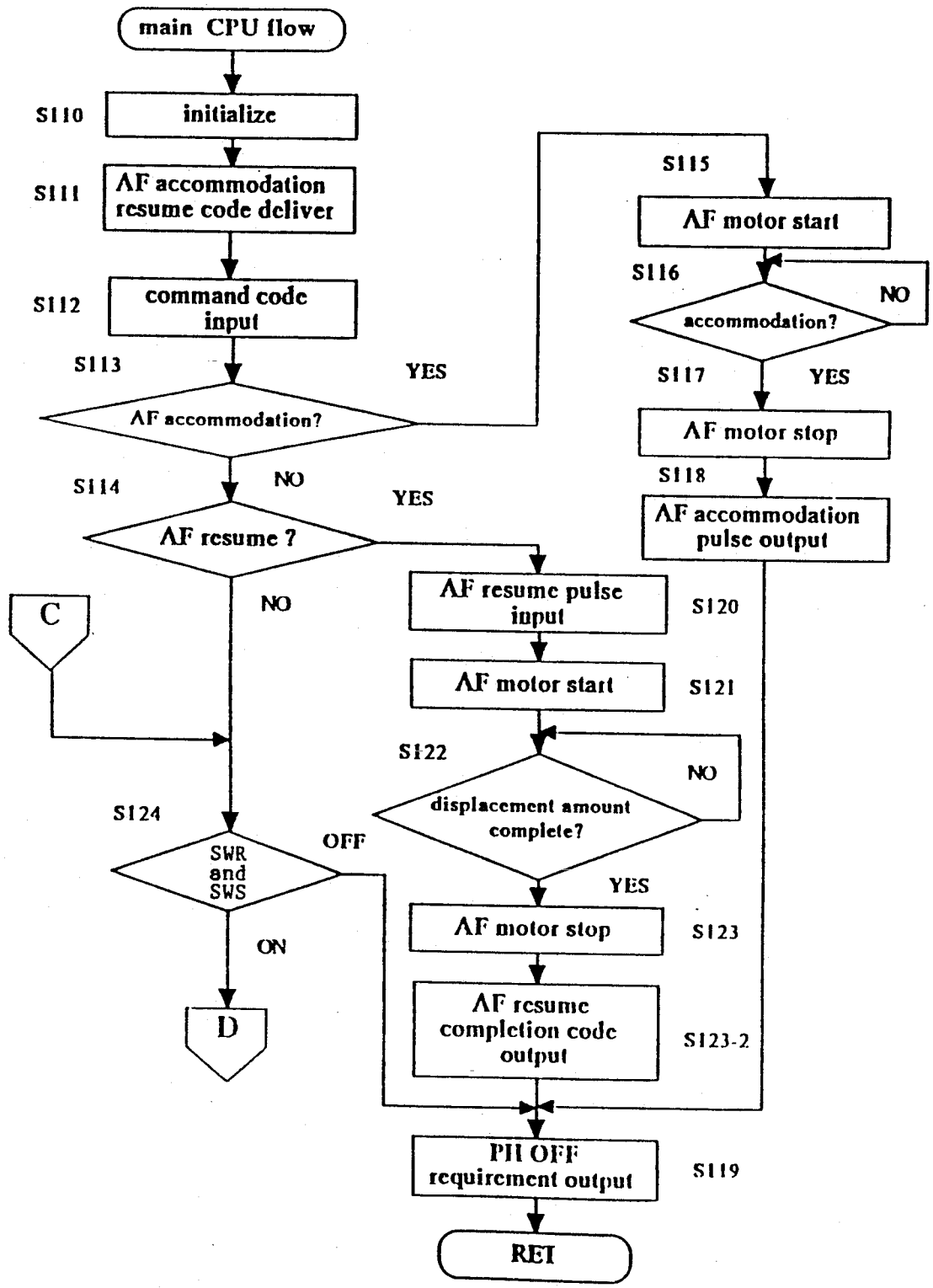
FIGS. 14 to 15 are flow charts illustrating the operation of a main CPU of the body; and, FIGS. 16 through 22 are flow charts illustrating the operation of a lens CPU.
Figure 14B:
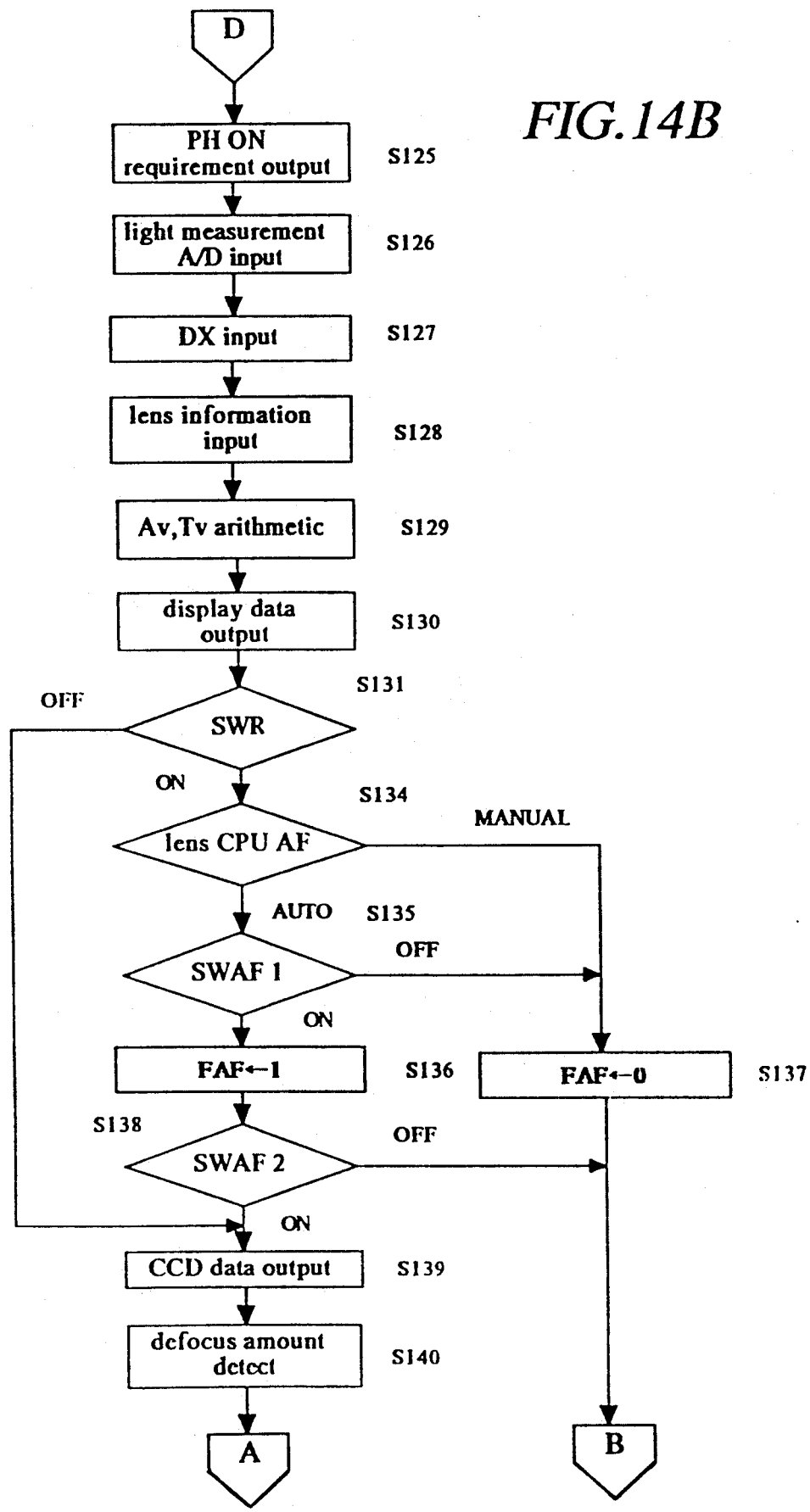

Next, how the main CPU 10 works will be explained with reference to FIGS. 14 and 15. This process is executed according to a program stored in the internal RAM of the main CPU 10.

The DC/DC converter is turned ON when terminal P1 is changed to "H" by the display CPU 11. Then, power is supplied to the main CPU 10 and the process starts.

In Step S110, the RAM port is initialized, and an AF accommodation-resumption code is sent to the display CPU 11 in Step 111. After this, a command code from the display CPU 11 is read in Step S112.

Steps S113 and S114 determine whether the command code is for an AF accommodation or an AF position resumption. In the case of accommodation, the AF motor 19 is driven until the lens reaches the accommodated position, and the number of pulses from this drive is sent out to the display CPU 11 as the resume information in Steps S115 through S118. In Step S119, a request for power hold OFF is made, and the process is terminated. If the command code is for resumption, the AF motor 19 is driven according to the number of pulses obtained from the display CPU 11 in Steps S120 through S123-2 to resume the lens focusing condition to the condition before accommodation.

If the command code is neither accommodation nor resumption, it is determined whether the light-measuring switch SWS or the release switch SWR is ON in Step S124.

When both switches are OFF, the display CPU 11 is requested to turn OFF the power hold in Step S119, and the process is terminated.

When either the light-measuring switch SWS or the release switch SWR is on, a request for power hold ON is sent out to the display CPU 11 in Step S125. Then, in Steps S126 through S129, the light-measuring A/D and DX information are entered from the A/D circuit 15 and DX input circuit 13, respectively. Then, the lens data and the selected shutter speed Tv and aperture Av are entered from the display CPU 11, and Tv and Av are computed.

In Step S130, the main CPU 10 transfers computed data Tv and Av to the display CPU 11 to display it on the LCD panel 12.

After this, the ON/OFF state of the release switch SWR is checked in Step S131.

When the release switch SWR is ON, if the AF is in the manual mode, flag FAF is set to "0+ and execution proceeds to Step S146 (FIG. 15), and a release process is executed. If the AF is in the automatic mode, flag FAF is set to "1," and it is determined whether it is a focus-priority mode or release-priority mode in Step S138. In the event that it is release-priority mode, execution proceeds to Step S146. Whether it is AF automatic or manual operation is determined based on the lens switch SWAF3 and the body switch SWAF2. In this case, the setting of the switch at the lense has priority.

When the release switch SWR is OFF, or when it is ON but AF is in the automatic mode with the focus-priority mode, a distance measuring process is executed.

Figure 15:
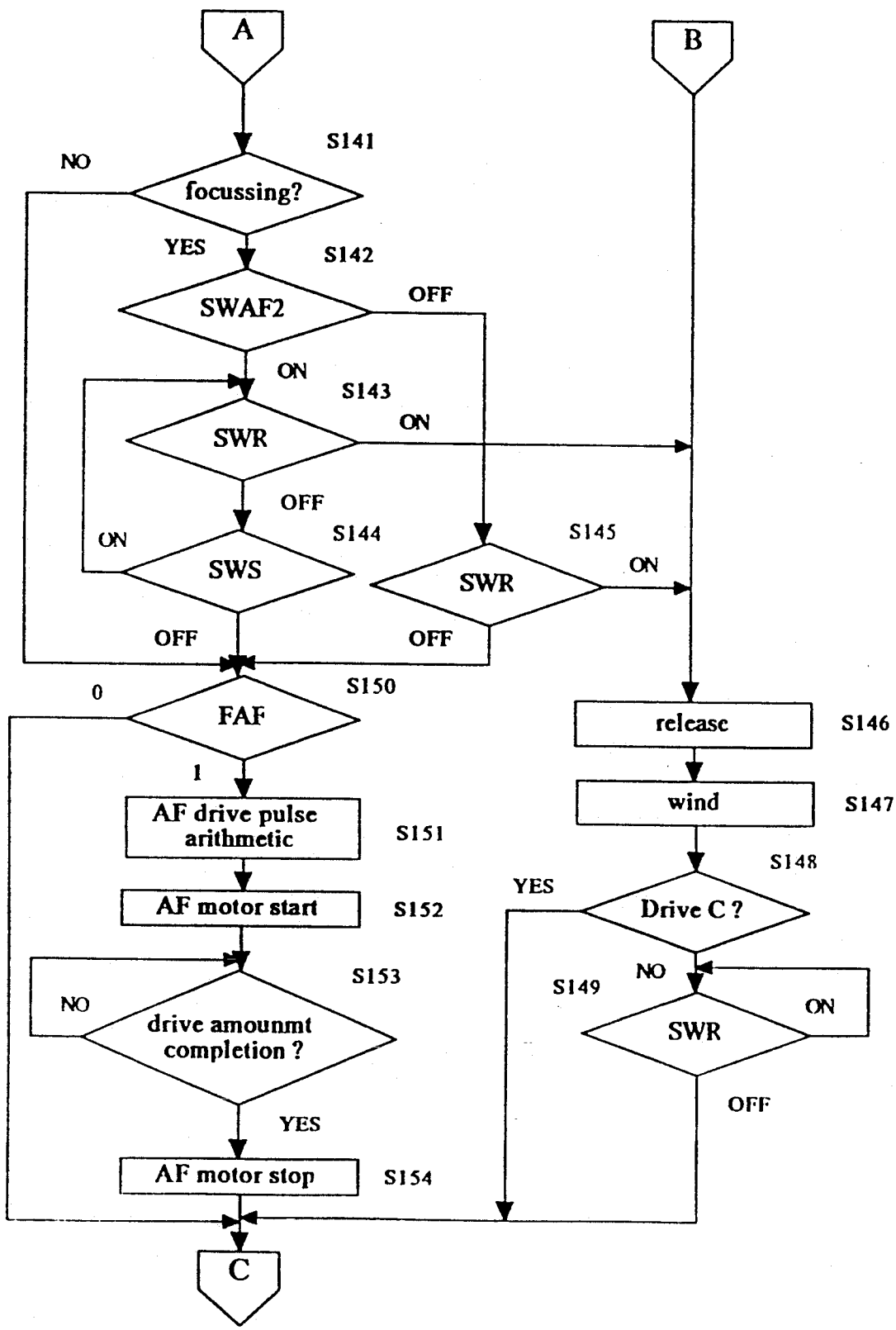

In Steps S139 and S140, a defocus amount is obtained by entering the AF data from the CCD processing circuit 18 and execution proceeds to Step S141 in FIG. 15.

When judged to be in focus in Step S141 of FIG. 15, it is determined in Step S142 whether it is the focus-priority mode or release-priority mode. In the case of the focus-priority mode, a focus lock is activated after the release switch SWR is turned ON while the light-measuring switch SWS is ON in Steps S142 and S143. Then, the release process is followed in Step S146 by turning ON the release switch SWR. In the case of the release-priority mode, execution proceeds to Step S145, and a shutter release takes place immediately if the release switch SWR is ON. If the release switch SWR is OFF, the lens moving process takes place with the release unlocked in Step S150 onward.

In Step S146, a shutter release takes place at a selected shutter speed and aperture. Upon completion of the release, the main CPU 10 drives the winding motor (not shown) to wind the film in Step S147. In the case of Drive C, i.e. a sequential mode, the execution immediately goes back to Step S124 in FIG. 14. In the case of a single mode, it goes back to Step S124 after the release switch SWR is turned OFF.

On the other hand, when the focus is judged to be out-of-focus in Step S141, or when it is judged to be in-focus with the light-measuring switch SWS OFF at the focus-priority mode, or the release switch SWR is OFF at the release-priority mode, the automatic or manual mode is determined by flag FAF in Step S150. In the automatic mode, the AF motor 19 is driven according to the number of pulses which is calculated based on the amount of defocus in Steps S151 through S154. In the manual focusing mode, the execution goes back to Step S124 in FIG. 14A after skipping Steps S151 through S154.

LENS CPU

The operation of the lens CPU 30 is explained below using FIGS. 16 through 21. These operations and processes are executed according to a program stored in ROM 30a of the lens CPU 30.

Figure 16:
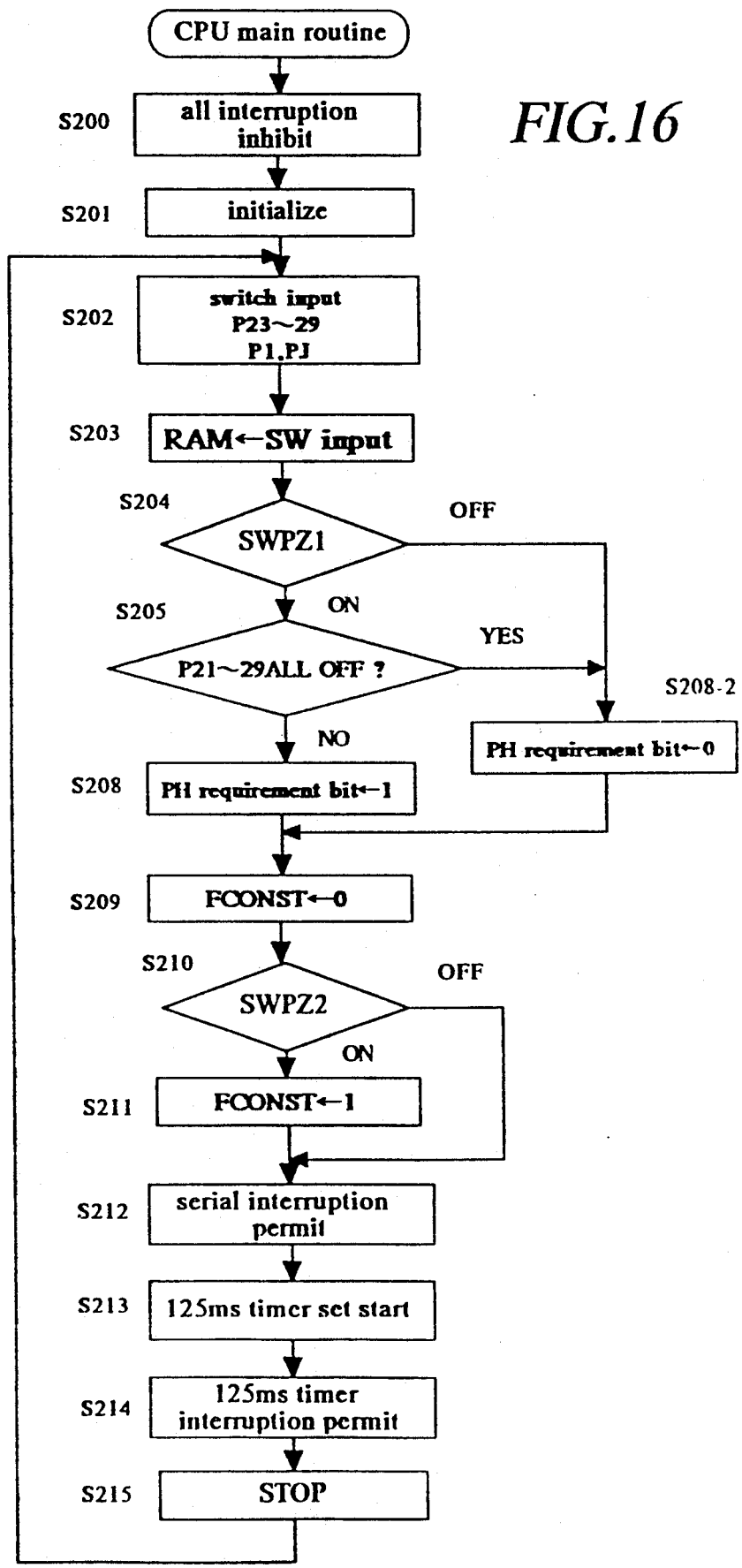

FIG. 16 shows a main flow chart of the lens CPU 10. The lens CPU 10 is activated by releasing the reset by the release circuit after the CONT contact point and the Fmin1 contact point are set to "H" by a command from the display CPU 11.

The lens CPU 11 disables all the interruptions described below in Step S200, executes an initialization in Step S201, and forms a loop in Steps S202 through S215.

In Step S202, data from each switch installed on the lens, the distance code plate 36 and the zoom code plate 37 are read in. These data are stored in RAM 30b in Step S203, and the process is executed in later steps based on these data.

In Steps S204 through S208, a zooming mode, that is, by power zoom or manual zoom is determined by the setting of the PZ switch of the lens. In the power zoom method, flag FPZ is set to "1" if either switch is ON, and the power hold request bit is set to "1"; execution then proceeds to Step S209.

In the manual zoom mode, or when all the switches are OFF in the power zoom mode, the power hold request bit is set to "0" in Step S208-2, and execution proceeds to Step S209.

In Steps S209 through S211, flag FCONST is set to "1" when a constant-magnification control is selected, or the flag is set to "0" when the control is not selected.

After the above-mentioned flag-setting processes, serial interruptions are enabled in Step S212, as described below. A 125 ms timer is set in Steps S213 through S215 and started. Then, timer interruptions are enabled and execution is halted until an interruption occurs.

THE LENS CPU SERIAL INTERRUPTION PROCESS

Figure 17A:
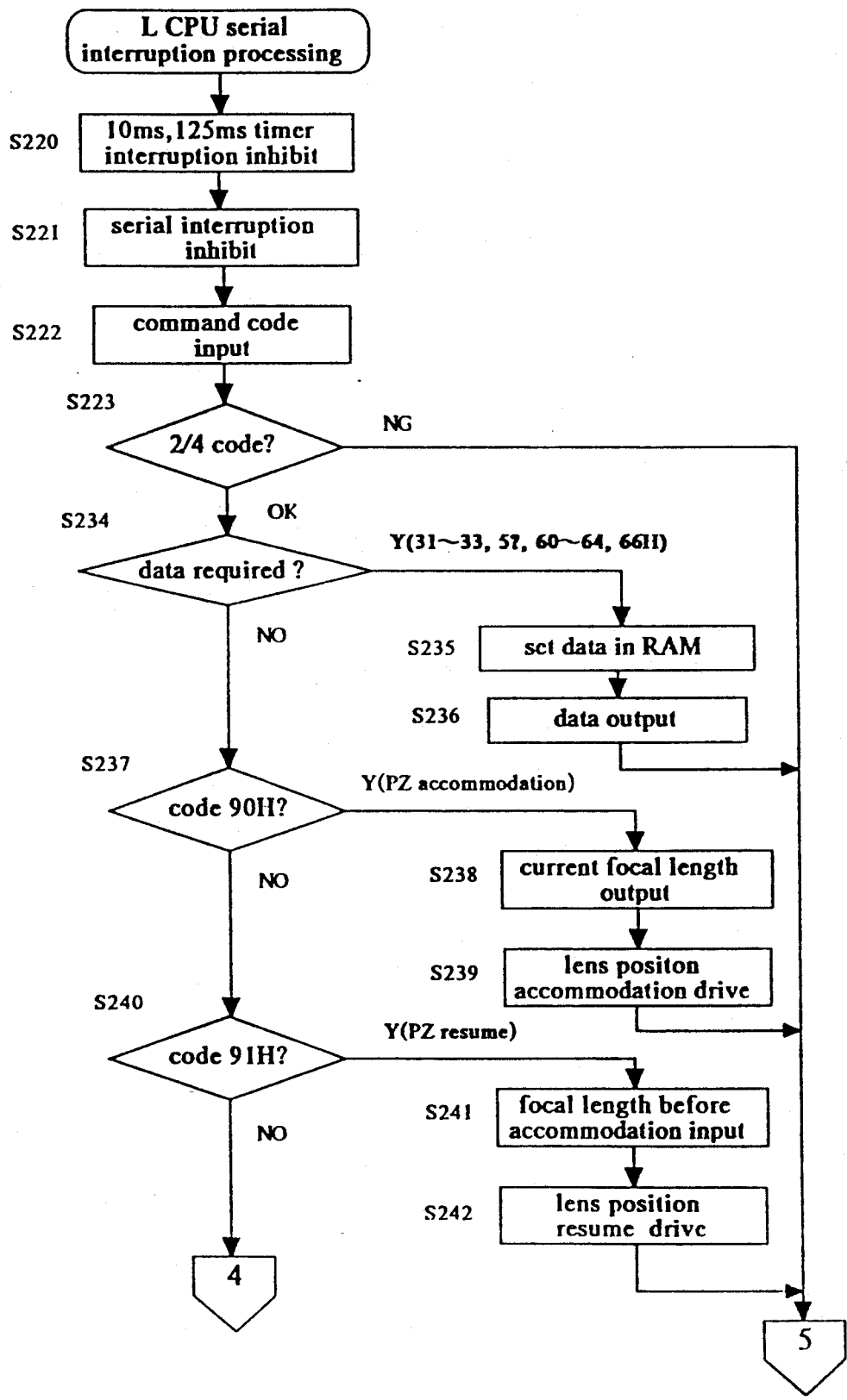
Figure 17B:
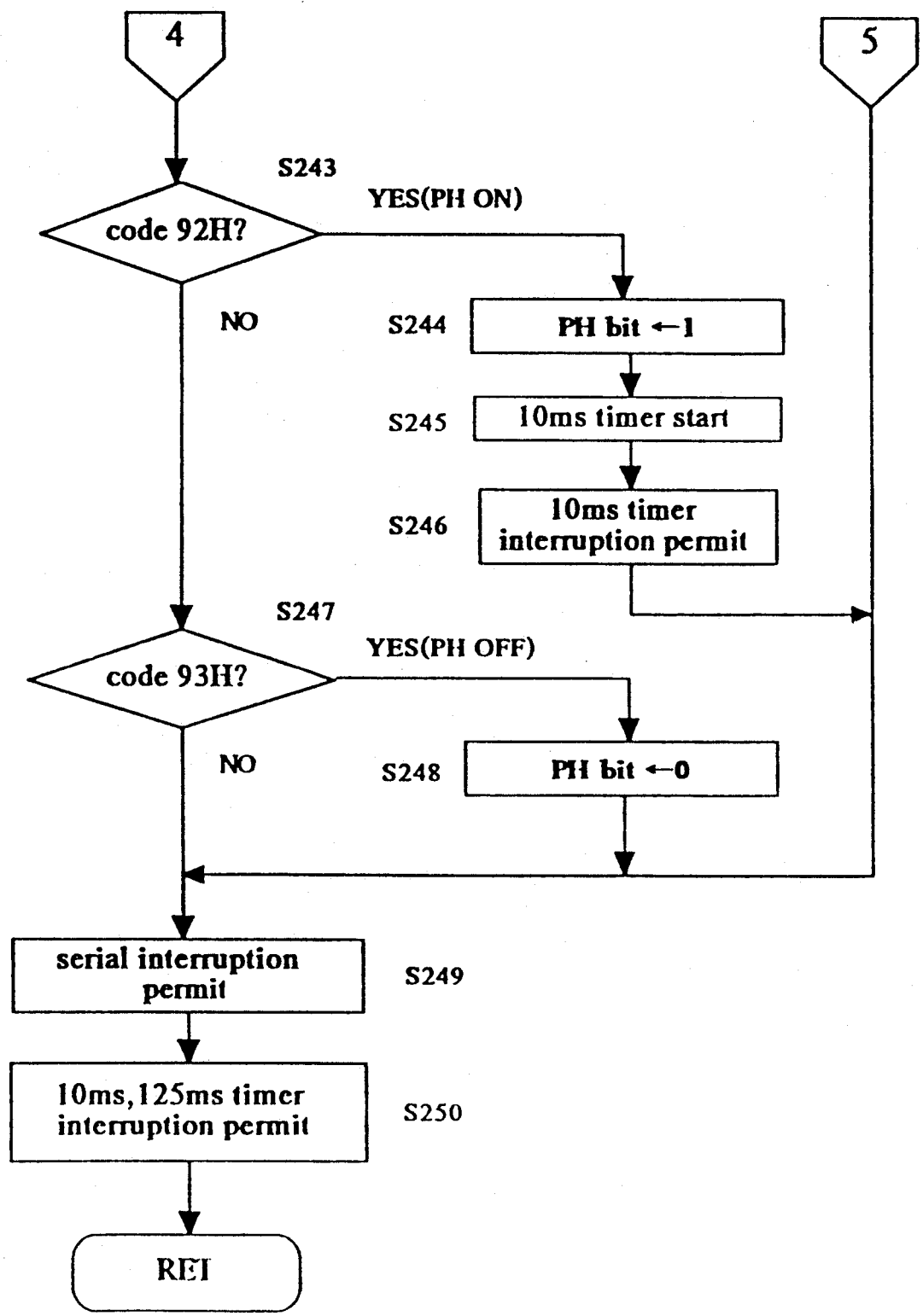

FIG. 17 shows the flow chart for the serial interruption process of the lens CPU 30 for input/output of data and commands, which is executed when there is a serial interruption from the display CPU 11 of the body 1.

Here, two timer interruptions and a serial interruption are disabled in Steps S220 and S221 until the process is completed. In Step S222, a command code from the body is read in by using the output of the clock for communication. In this process, "H" and "L" of each contact point are shown in FIG. 4 mentioned above.

Step S223 and the following steps are a routine that executes processes according to specific commands.

First, whether a 2/4 code is correct is checked in Step S223. As shown in Table 4, the upper four bits of a command code consists of two 1's and two 0's. Because of this, if these conditions are not met, it is an input error of the command code, and no processes are executed. In such a case, interruptions are enabled in Steps S249 and S250, and then execution returns to the main routine.

If the 2/4 code is judged to be correct, it is determined whether the command code is a data request in Step S234. If it is a data request, the data required in Step S235 is set in RAM 30*b*, and sent to the display CPU 11 in Step S236. Then, execution proceeds to Step S249.

If the command code is not a data request, it is determined whether the code is 90H in Step S237. If it is 90H, which means a PZ accommodation, the present data of the focal length is sent to the display CPU 11 as data for the resumption position in Step S238. After the PZ motor 34 is driven so that the lens is moved to the accommodated position in Step 2239, execution proceeds to Step S249.

If the command code is not 90H, it is determined whether the code is 91H in Step S240. If it is 91H, which means PZ position resumption, the data of the focal length which was obtained for accommodation is entered as input from the display CPU 11 in Step S241. The PZ motor 34 is driven in Step S242 so as to adjust the lens to the focal length before its accommodation. Then, the process proceeds to Step S249.

If the command code is not 91H, it is determined whether the code is 92H in Step S243. If it is 92H, which means that the power hold of the PZ motor VBATT is turned ON in the body, the PH request bit is set to "1" in Step S244. In Steps S245 and S246, a 10 ms timer is started, as mentioned later, after enabling an interruption for 10 ms. Then execution proceeds to Step S249.

If the command code is not 92H, it is determined whether it is 93H in Step S247. If it is 93H, which means the power hold is OFF, the PH request bit is set to "0" in Step S248, and execution proceeds to Step S249.

When the command code is none of the above, interruptions are enabled and execution returns to the timer routine in Steps S249 and S250.

10 ms TIMER INTERRUPTION PROCESS

FIG. 18 illustrates a timer interruption process of the lens CPU 30. This process is executed to control the power zooming at a 10 ms interval when it is made possible during a serial interruption, as mentioned above.

When this process is executed, the serial interruption, 125 ms interruption and 10 ms interruption are disabled in Steps S260 and S261.

Figure 19:
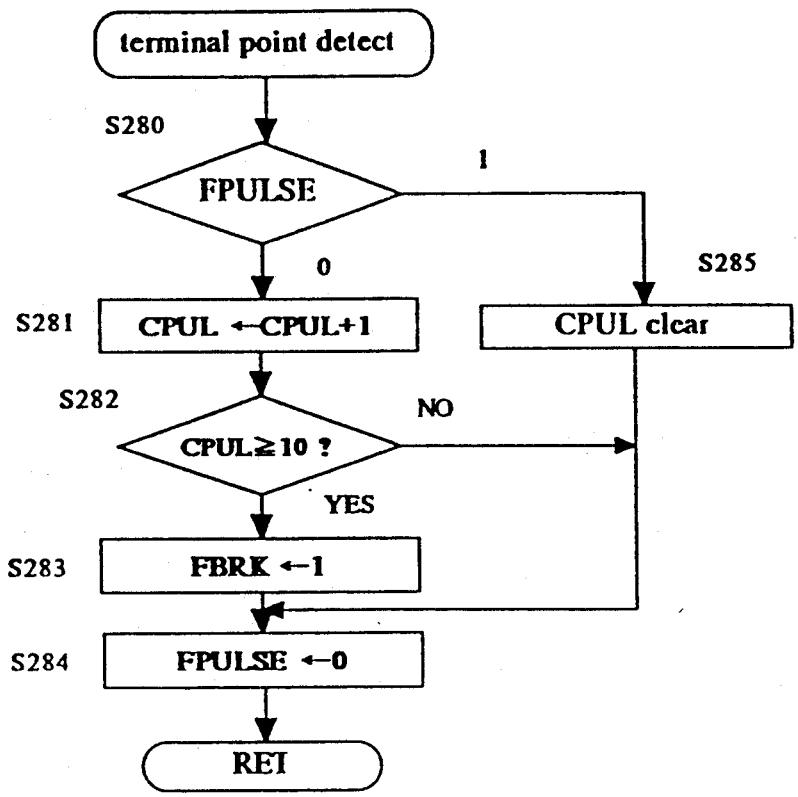

In Step S262, a subroutine for detecting zooming extremities is called, as shown in FIG. 19. This extremity points detecting process functions to detect when the zoom lens has reached its tele-extremity or wide-extremity.

In the extremities detecting process, the condition of flag FPULSE is checked in Step S280. If there is no change in the PZ pulse and the flag is "0," counter CPUL is incremented in Step S281. When the P2 pulse changes and flag FPULSE is set to "1", counter CPUL becomes "1". Thus, Step S285 is performed to clear CPUL and Step S284 is executed. Then, it is determined whether the counter CPUL is greater than or equal to 10, or not, is checked at step S282. Flag FPULSE is set to "1" when the PZ pulse changes.

If the flag is greater than or equal to 10, flag FBRK is set to "1" to apply a brake to the PZ motor 34 in Step S283, and flag FPULSE is cleared in Step S284. Then, the execution returns.

If the counter CPUL is smaller than 10, Step S283 is skipped, and Step S284 is executed.

Since the extremities detecting process is executed every 10 ms, flag FBRK is set to "1" when there are no changes in the PZ pulse within 100 ms, and it is determined that the lens has reached the extremities.

When the execution returns from the extremities detecting process to the 10 ms timer interruption process, the state of the flag FCONST is checked in Step S263. Flag FCONST is set based on the ON/OFF condition of SWPZ2 in the main routine mentioned above. If this flag is "1," the constant image magnification control is executed in Step S264. The constant image magnification control is the control that makes the subject size on the film constant by changing the lens magnification when the distance between the subject and camera is changed. It is done in the following manner. The change in the magnification is calculated from the defocus amount of the subject which once was in focus but has moved. Then, the change in magnification is converted to the driving pulse of the PZ motor 34 to control the motor. A detailed explanation about this process is not given here.

If flag FCONST is "0," a zoom operation code 38 is read in Step S265, and a zooming direction and speed are determined by executing a subroutine for selecting a speed and a direction in Step S266.

In Step S267, it is determined whether the brake should be applied to the PZ motor 34 from the condition of flag FBRK. If not brake is applied, a zoom code corresponding to the focal length is read in from the zoom code plate 3 in Step S268. In accordance with this, the PWM control value is compensated by the speed compensation process in Step S269. Flag FBRK becomes "1" in both cases where the lens has reached the terminal point, or a zoom halt has been indicated by operating the zoom operation ring 51.

Figure 20:
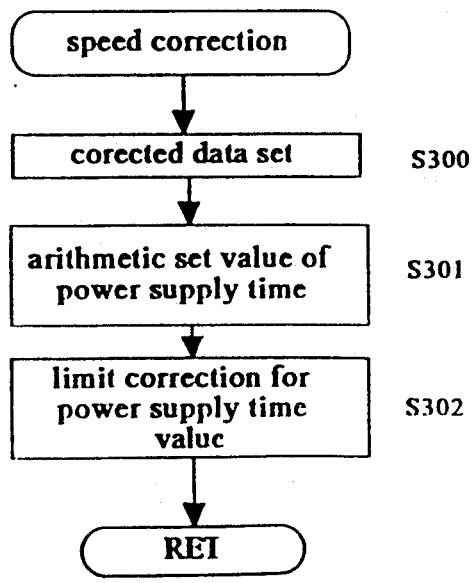

As mentioned above, the camera operates so as to hold the focal length change constant by adjusting the rotating speed of the PZ motor 34. A speed correction process is the process that enables such control. In the speed compensation process, correction data is set in Step S300, as shown in FIG. 20. As mentioned above, the compensation data is represented by a formula, where f'(xn) is a rate of change in the nth division and f'(xmax) is a maximum rate of change in all the divisions:

$$\beta = f'(xn)/f'(xmax)$$

The function and constants necessary to calculate the compensation value $\beta$ (Beta) are stored in ROM 30*a*. In Step S301, the PWM current supplying time that holds the focal-length changing rate constant can be obtained by multiplying the above Beta by the PWM current supplying time which is determined by the speed data described below. Step S302 limits the computed value within a certain range to prevent the motor from stopping when the calculated current supplying time is too small.

Upon completion of the speed compensation process, the PZ motor 34 starts driving in Step S270. The 10 ms timer is set and started in Step S271. Then, all interruptions are enabled in Steps S272 and S273, and execution returns.

Figure 21:
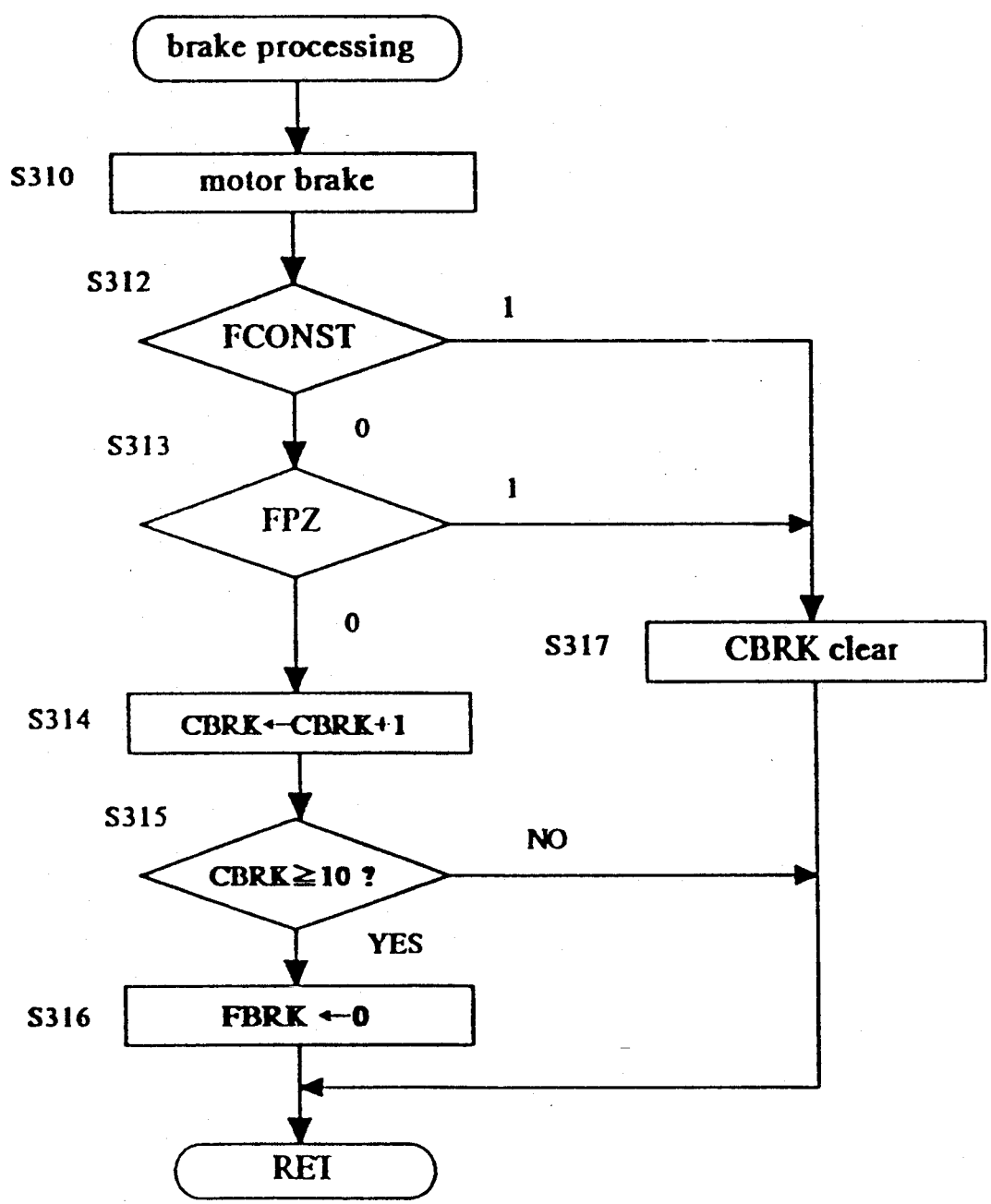

When the flag FBRK is set to "1," a brake process is executed, as shown in FIG. 21, to halt the revolution of the PZ motor 334 in Step S274.

In the brake process, a brake is applied to the PZ motor 34 in Step S310. If it is not in the constant magnification mode and if flag FPZ is "0", the brake time is set in Steps S312 through S316 in the same manner as the zooming extremities are detected. Flag FPZ is set to "1" when the zoom is driven in the speed & direction selection process described later.

In Step S314, counter CBRK is incremented by 1 to measure the break time, and it is determined whether the counter becomes greater than or equal to 10 in Step S315. If it is greater than or equal to 10, flag FBRK is set to "0" in Step S316, and the execution returns. When it is smaller than 10, Step S316 is skipped and the execution returns.

If flag FPZ is set to "1," counter process CDBRK is cleared in Step S317.

Accordingly, if flag FBRK is set to "1," a brake is applied for 100 ms by having the process can go from Step S267 to S274.

When the brake process is completed and flag FBRK becomes "0," the power hold request bit is set to "0" in Step S276 and the 10 ms timer interruption is disabled in Step S277. 125 ms timer interruptions and serial interruptions are enabled, and execution returns in Steps S278 and S273.

SPEED/DIRECTION SELECTING PROCESS

Figure 22A:
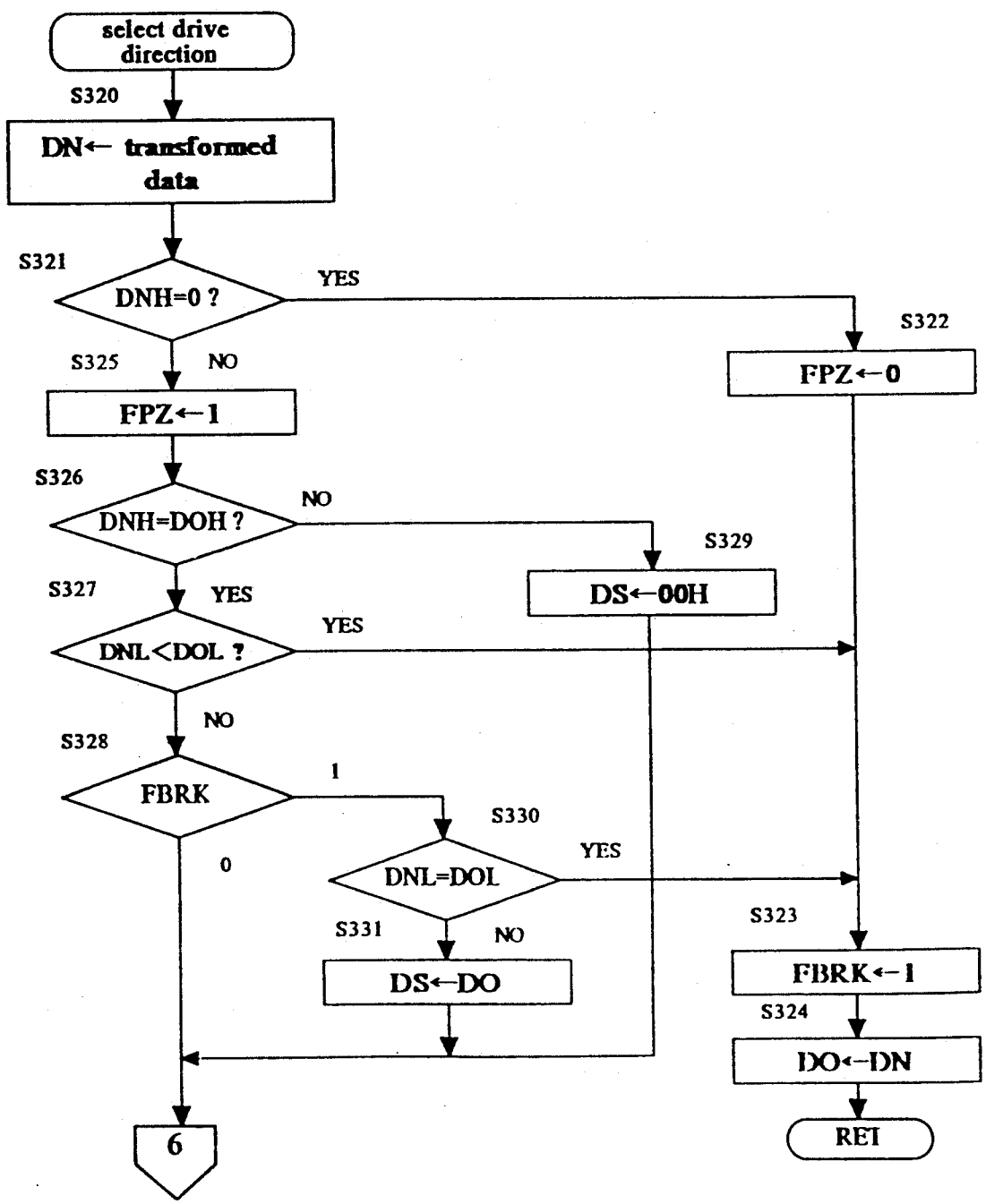
Figure 22B:
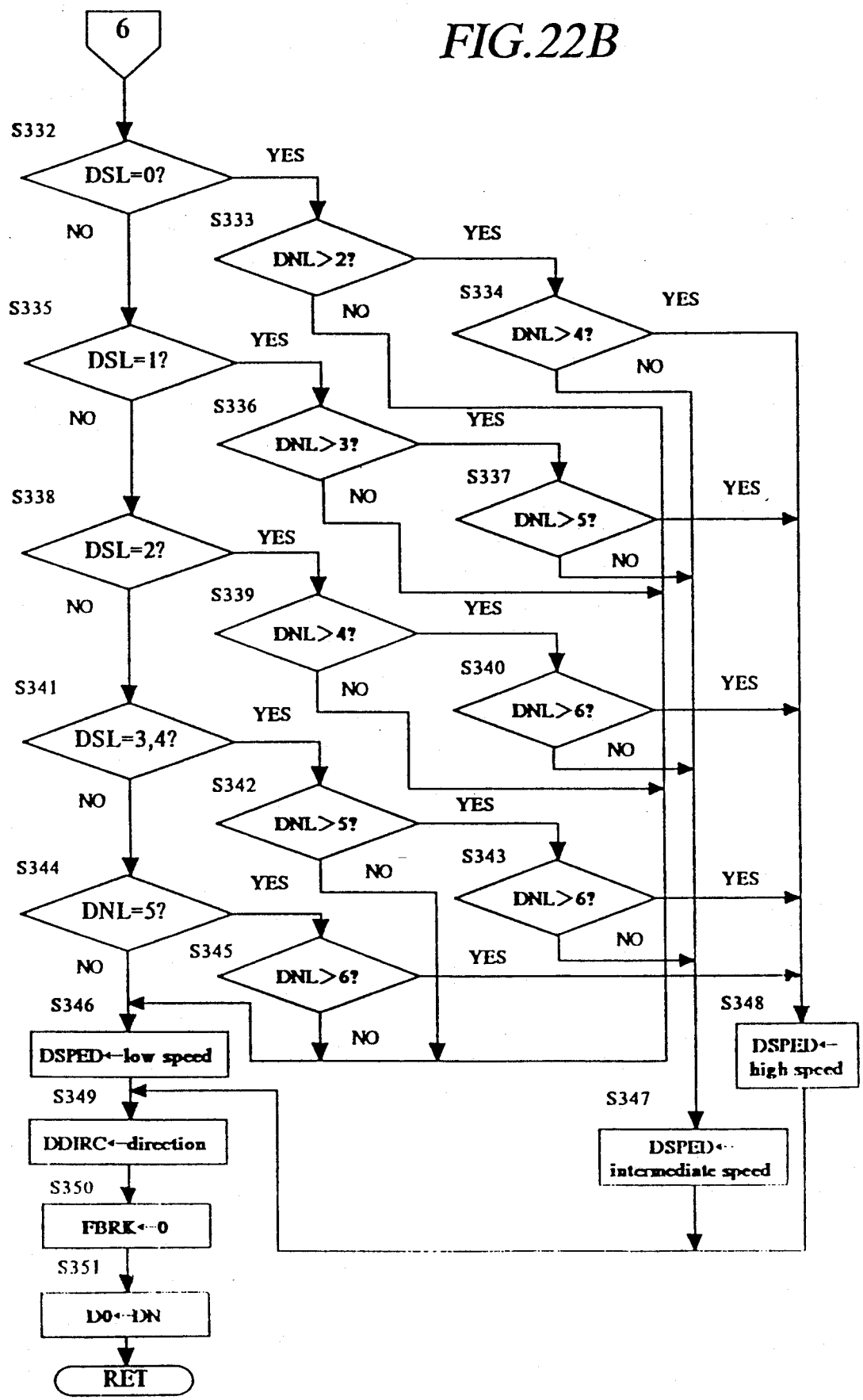

FIG. 22 shows a subroutine which selects a speed and direction. This subroutine is called from Step S266 (FIG. 18), which is for the 10 ms timer interruption process of the lens CPU 30. This process determines the direction and the speed of the zooming according to the operating conditions of the zoom operating ring, and is a concrete method to enable the judgments shown at the bottom of FIG. 5.

6-bit data entered from ports P24 through P29 of the lens CPU 30 is converted to a 1-byte code according to Table 5, shown below.

TABLE 5

Data Conversion Table for Zoom Operation Code Board

| Ports (ON=1, OFF=0) | | | | | | Location | Conversion Code Bit 7 6 5 4 3 2 1 0 |
|---|---|---|---|---|---|---|---|
| P27 | 28 | 29 | 24 | 25 | 26 | | |
| 0 | 0 | 0 | 0 | 0 | 1 | F7 | 0 0 1 0 0 1 1 1 |
| 0 | 0 | 0 | 1 | 0 | 1 | F6 | 0 0 1 0 0 1 1 0 |
| 0 | 0 | 0 | 1 | 1 | 1 | F5 | 0 0 1 0 0 1 0 1 |
| 0 | 0 | 0 | 0 | 1 | 1 | F4 | 0 0 1 0 0 1 0 0 |
| 0 | 0 | 0 | 0 | 1 | 0 | F3 | 0 0 1 0 0 0 1 1 |
| 0 | 0 | 0 | 1 | 1 | 0 | F2 | 0 0 1 0 0 0 1 0 |
| 0 | 0 | 0 | 1 | 0 | 0 | F1 | 0 0 1 0 0 0 0 1 |
| 0 | 0 | 0 | 0 | 0 | 0 | NT | 0 0 0 0 0 0 0 0 |
| 1 | 0 | 0 | 0 | 0 | 0 | N1 | 0 0 0 1 0 0 0 1 |
| 1 | 1 | 0 | 0 | 0 | 0 | N2 | 0 0 0 1 0 0 1 0 |
| 0 | 1 | 0 | 0 | 0 | 0 | N3 | 0 0 0 1 0 0 1 1 |
| 0 | 1 | 1 | 0 | 0 | 0 | N4 | 0 0 0 1 0 1 0 0 |
| 1 | 1 | 1 | 0 | 0 | 0 | N5 | 0 0 0 1 0 1 0 1 |
| 1 | 0 | 1 | 0 | 0 | 0 | N6 | 0 0 0 1 0 1 1 0 |
| 0 | 0 | 1 | 0 | 0 | 0 | N7 | 0 0 0 1 0 1 1 1 |

In this process, the variables to store the conversion codes in RAM 30b are as follows:

| Latest code | DN DNH: upper 4 bits, DNL: lower 4 bits |
|---|---|
| Previous code | DO DOH: upper 4 bits, DOL: lower 4 bits |
| Starting position | DS DSH: upper 4 bits, DSL: lower 4 bits |

In the speed & direction selection process, the conversion code is stored in DN in Step S320. When the upper 4 bits are 0's, that is, the neutral position, flag FPZ is cleared in Steps S322 through S324. Then, when flag FBRK is set to "1" and the code in DN is stored into DO, execution returns.

If the position is not neutral, flag FPZ is set to "1" in Step S325, and the driving direction is determined in Steps S326 through S331. When DNH and DOH are equal, that is, the zoom operation ring 51 has not been changed, it is determined whether it is moved toward one of the zooming extremities or towards the neutral position. If the operation is toward the neutral position, flag FBRK is turned ON in Step S323 and execution returns.

IF the direction has been changed, the starting position for movement (the initial position) is set to the neutral position, and a speed selection is done in Steps S332 and onward.

If the direction has not been changed and an operation towards the zooming extremities or zoom operation ring 51 has not been altered, whether or not flag FBRK was set to "1" in the previous process determines if it is being driven or not. If flag FBRK was set to "1" in the previous process, and if there is no change in the code, execution starts again after going through Steps S323 and S324. If there is a change in the code, the process goes into a speed-setting routine after establishing the previous code as the code for initial position. If the flag FBRK was not "1" in the previous process, the process goes into a speed-setting routine immediately.

In Steps S332 through S345, the process goes into a speed-setting routine based on the starting position of the zoom operation ring 51 (the initial position) and the number of revolutions, as shown at the bottom of FIG. 5.

If the starting position is at the neutral position, speed data DSPED is set to high in Step S348 when the rotating position of the zoom operation ring 51 is greater than 4, set to medium in Step S347 when it is between 2 and 4, and set to low in Step S346 when it is smaller than 2.

If the starting position is F1, or N1, high is selected when the rotating position of the zoom operation ring 51 is greater than 5, medium when it is between 3 and 5, and low when it is smaller than 2.

If the starting position is F2 or N2, high is selected when the rotating position of the zoom operation ring 51 is greater than 6, medium when it is between 4 and 6, and low when it is smaller than 3.

If the starting position is F3, F4, N3 or N4, high is selected when the rotating position of the zoom operation ring 51 is greater than 6, medium when it is between 5 and 6, and low when it is smaller than 4.

If the starting position is F5, or N5, high is selected when the rotating position of the zoom operation ring 51 is greater than 6, and low when it is smaller than 5.

If the starting position is F6, F7, N6 or N7, only low is selected, even when the rotating position changes.

Upon completion of the speed selection, a driving direction DDIRC is set at data DDIRC in Step S349, flag FBRK is cleared in Step S350, the code in DN is stored into DO in Step S351, and execution starts over again.

In the above control, if the zoom operation ring 51 is rotated from F6 to f7, or from N6 to N7, while the zoom is stopping, only the low speed is selected because the operation ring 51 reaches the terminal point quickly. Therefore, the divisions between F7 and N7 are designed to be very narrow, and those between F6 and N6 are designed to be narrower than other divisions so that F5 and N5 can be moved easily from F7 to N7 when rotating the operation ring 51 towards the neutral position. This makes it possible to select the high and low speed positions when rotating the ring toward the terminal position again.

In addition, the revolution speed of the PZ motor 34 is adjusted by the process for the constant focal-length changing rate, enabling zooming at a constant changing rate.

The foregoing is the explanation of the claimed invention using figures and examples of the usage. It should be clear that this invention is not limited to the examples given here. For instance, the zooming speeds can be selected at four levels, or changed continuously.

Moreover, it is obvious that this invention can be applied to lens shutter type cameras, movie cameras or the like.

As explained above, this invention of the power zoom system enables easy zooming even when a zoom switch with many positions are used to control it, because the driving direction and the speed of zooming the camera lens are controlled based on the setting positions before and after its operation.

As explained above, this invention of the power zoom system enables the focal length change of the lens to be held constant by compensation even when the focal length changing rate to a constant amount of rotation is not constant because of a cam ring design.

We claim:

1. A camera system, comprising:
a camera body, and an interchangeable lens that is detachably mounted to said camera body;
said interchangeable lens comprising:
input/output means for inputting and outputting information relative to said camera body, and timing means for generating and outputting a clock signal; and,
said camera body comprising:
information processing means for inputting and outputting data relative to said input/output means of said lens on a basis of said clock signal outputted from said timing means of said lens.

2. The camera system according to claim 1, wherein said interchangeable lens and said camera body respectively include a plurality of electrical contacts, said contacts on said interchangeable lens and said contacts on said camera body being electrically connected relative to one another when said interchangeable lens is mounted to said camera body, and wherein said input/output means and said information processing means perform communication of said information therebetween by means of an electric connection between said electrical contacts on said interchangeable lens and said camera body.

3. The camera system according to claim 2, wherein said camera body further comprises an electric power source for supplying electrical power to said input/output means, said timing means and said information processing means, and wherein said input/output means and said timing means are actuated by said electrical power from said camera body through a portion of said electrical contacts.

4. The camera system according to claim 1, wherein said information processing means performs a serial communication with said input/output means by means of said clock signal outputted from said timing means so as to achieve said communication of information by means of said serial communication.

5. The camera system according to claim 1, wherein said information processing means actuates said timing means through said input/output means.

6. The camera system according to claim 5, wherein said information processing means causes said timing means to output said clock signal through said input/output means and thereafter performs data communication relative to said input/output means on the basis of said clock signal.

7. The camera system according to claim 1, wherein said interchangeable lens further comprises means for controlling an actuation of said timing means and which selects information for data communication.

8. This camera system according to claim 7, wherein, when data is inputted from said input/output means, said information processing means outputs a data requirement command to said control means by means of said clock signal outputted from said timing means.

9. The camera system according to claim 8, wherein, when said data requirement command is inputted from said information processing means, said control means outputs corresponding data to said, information processing means by means of said clock signal outputted from said timing means.

10. The camera system according to claim 7, wherein said interchangeable lens further includes a focal lens group that is movable in an optical axis direction, and a length code plate for detecting position information of said focal lens group, said control means outputting said position information of said focal lens group by said length code plate to said information processing means by means of said clock signal outputted from said timing means.

11. The camera system according to claim 7, wherein said interchangeable lens further includes at least one variable magnification lens group that is movable in said optical axis direction for changing a focal length of said interchangeable lens, and a zoom code plate for detecting a position of said at least one variable magnification lens group, and wherein said control means outputs said focal length read by said zoom code plate by means of said clock signal outputted from said timing means through said input/output means.

12. The camera system according to claim 11, wherein said interchangeable lens further a memory for memorizing said focal length read by said zoom code plate.

13. The camera system according to claim 12, wherein said control means outputs said focal length memorized in said memory to said information processing means by means of said clock signal outputted from said timing means.

14. The camera system according to claim 11, wherein said interchangeable lens further comprises a PZ motor for driving said at least one variable magnification lens group, said PZ motor being controlled by said control means.

15. The camera system according to claim 14, wherein said control means controls said PZ motor on the basis of said focal length inputted thereinto from said information processing means through said input/output means.

16. A camera system for performing data communication between a camera body and an interchangeable lens detachably mounted to said camera body, comprising:
- input/output means disposed in said lens for inputting and outputting data relative to said camera body;
- timing means disposed in said lens for generating and outputting a clock signal; and
- information processing means disposed in said camera body for outputting data to said input/output means of said lens on a basis of said clock signal outputted from said timing means of said lens.

17. The camera system of claim 16, wherein said information processing means of said camera body inputs data from said input/output means of said lens on a basis of said clock signal outputted from said timing means of said lens.

18. The camera system of claim 16, wherein said lens and said camera body further comprise a plurality of electrical contacts, respectively, that are electrically connected relative to one another when said lens is mounted to said camera body, said input/output means and said information processing means performing data communication therebetween based on electrical connection between said electrical contacts of said lens and said camera body.

19. The camera system of claim 16, wherein said information processing means of said camera body performs serial communication with said input/output means of said lens on a basis of said clock signal outputted from said timing means of said lens.

20. The camera system of claim 16, wherein said lens further comprises means for controlling actuation of said timing means and for selecting information for data communication with said camera body.

* * * * *

UNITED STATES PATENT AND TRADEMARK OFFICE
CERTIFICATE OF CORRECTION

PATENT NO. : 5,223,877
DATED : June 29, 1993
INVENTOR(S) : M. Kawasaki et al

It is certified that error appears in the above-indentified patent and that said Letters Patent is hereby corrected as shown below:

On the title page, item [73], Assignee, line 1, insert —Kogyo— after "Kogaku".
On the title page, in item [56], References Cited, line 12, insert —354/286— after "Ogura et al.".
Column 22, line 26, (claim 9, line 4) delete "," after "said".
Column 22, line 49, (claim 12, line 2) insert —includes—after "further".

Signed and Sealed this

Fifth Day of September, 1995

Attest:

BRUCE LEHMAN

Attesting Officer    Commissioner of Patents and Trademarks